US012586237B2

(12) United States Patent
Stennett et al.

(10) Patent No.: US 12,586,237 B2
(45) Date of Patent: Mar. 24, 2026

(54) DEVICE, COMPUTER PROGRAM AND METHOD

(71) Applicants:Sony Europe B.V., Surrey (GB); Sony Group Corporation, Tokyo (JP)

(72) Inventors: Carl Stennett, Basingstoke (GB); Francis Smedley, Basingstoke (GB)

(73) Assignees: SONY EUROPE BV, Surrey (GB); Sony Group Corporation, Tokyo (JP)

( * ) Notice: Subject to any disclaimer, the term of this patent is extended or adjusted under 35 U.S.C. 154(b) by 311 days.

(21) Appl. No.: 18/216,635

(22) Filed: Jun. 30, 2023

(65) Prior Publication Data

US 2024/0020874 A1      Jan. 18, 2024

(30) Foreign Application Priority Data

Jul. 15, 2022   (GB) ..................................... 2210396

(51) Int. Cl.
| | |
|---|---|
| *G06T 7/73* | (2017.01) |
| *A63B 71/06* | (2006.01) |
| *G06T 7/13* | (2017.01) |
| *G06T 7/20* | (2017.01) |

(52) U.S. Cl.
CPC ........... *G06T 7/73* (2017.01); *A63B 71/0605* (2013.01); *G06T 7/13* (2017.01); *G06T 7/20* (2013.01); *A63B 2243/0037* (2013.01); *G06T 2207/10016* (2013.01); *G06T 2207/20081* (2013.01); *G06T 2207/30224* (2013.01)

(58) Field of Classification Search
CPC .... G06T 7/73; G06T 7/13; G06T 7/20; G06T 2207/10016; G06T 2207/20081; G06T 2207/30224; G06T 2207/20084; G06T 2207/30221; G06T 7/246; G06T 7/12; A63B 71/0605; A63B 2243/0037; A63B 2024/0034; G06V 20/42; G06V 20/44; G06V 10/44

USPC ........................................................ 382/103
See application file for complete search history.

(56) References Cited

U.S. PATENT DOCUMENTS

| | | | |
|---|---|---|---|
| 11,305,176 | B2 | 4/2022 | Moravchik |
| 2012/0237081 | A1 | 9/2012 | Datta |
| 2020/0012861 | A1* | 1/2020 | Chan .................. H04N 21/8456 |

FOREIGN PATENT DOCUMENTS

WO        2012092148  A2      7/2012

OTHER PUBLICATIONS

Sanguesa, Arbues, "Basketball ball tracking: towards an automatic detection of infractions", Bachelor Thesis, Universat Pompeu Fabra, dated 2014-2015, 83 pages.
Chakraborty, Bodhisattwa et al., "A real-time trajectory-based ball detection-and-tracking framework for basketball video", Journal of Optics, vol. 42, No. 2, dated Apr.-Jun. 2013, 15 pages.
Search Report from corresponding United Kingdom application No. GB2210396.4, dated on Jan. 16, 2023, 3 pages.

* cited by examiner

*Primary Examiner* — Stephen P Coleman
(74) *Attorney, Agent, or Firm* — Tucker Ellis LLP

(57) ABSTRACT

A device for detecting a goaltending event includes circuitry configured to: determine a real-life position of a basketball from a video stream; detect an impact on the basketball from the movement of the basketball captured in the video stream; output a signal indicating a detected goaltending event based on the detected impact and the real-life position of the basketball.

20 Claims, 21 Drawing Sheets

300

810

810

810

810

910

900

Impact Detection Output ⟶

Real-Life Rim Position ⟶

Real-Life Skeletal Feature Position ⟶

320

1220

1240

1260

1

DEVICE, COMPUTER PROGRAM AND METHOD

CROSS REFERENCE TO RELATED APPLICATIONS

The present application claims priority to United Kingdom Patent Application No. 2210396.4, filed Jul. 15, 2022, the content of which is incorporated herein by reference in its entirety.

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Basketball is a very fast paced and popular sport. Accordingly, decisions made by basketball referees should, wherever possible, be correct and made quickly. Since basketball is fast paced, referees need assistance in determining infractions and making correct decisions.

Typically, in a competitive game of basketball, there are two referees (a referee and an umpire) to officiate a game and to avoid errors. However, despite this, on occasion errors are made and so referees require further assistance.

It is an aim of the disclosure to address this issue.

SUMMARY

According to the present disclosure, there is provided a device for detecting a goaltending event, comprising circuitry configured to: determine a real-life position of a basketball from a video stream; detect an impact on the basketball from the movement of the basketball captured in the video stream; output a signal indicating a detected goaltending event based on the detected impact and the real-life position of the basketball.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

2

Figure 3:
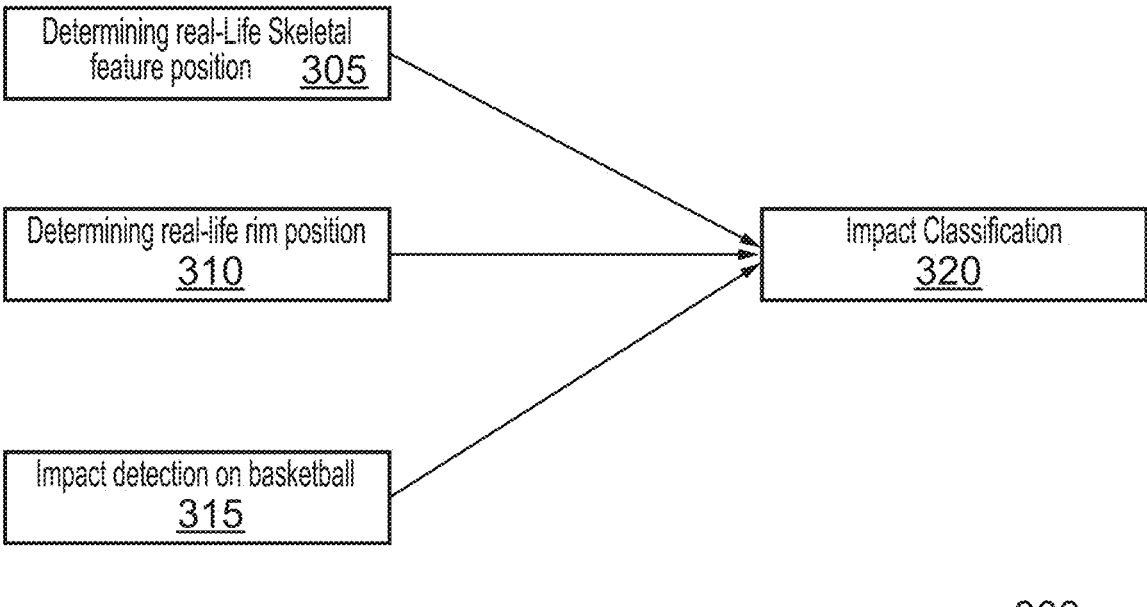
Figure 4A:
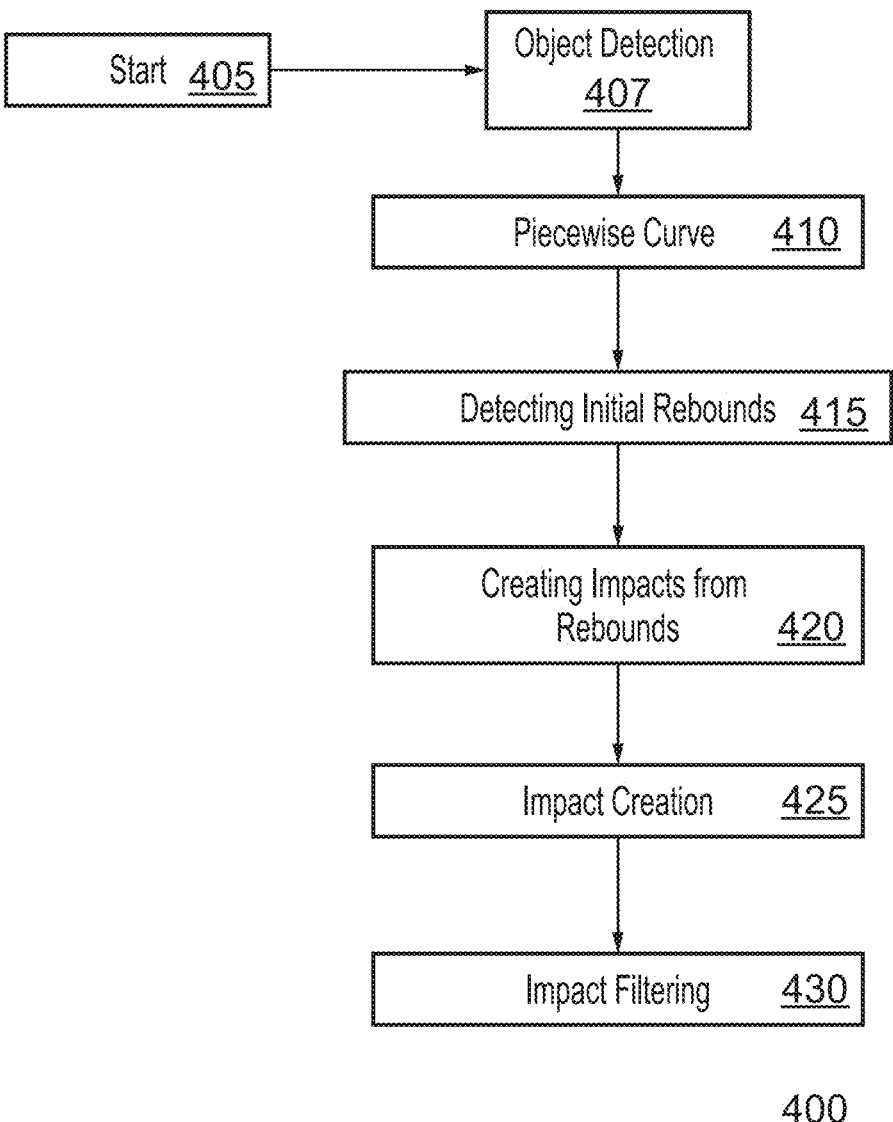
Figure 4B:
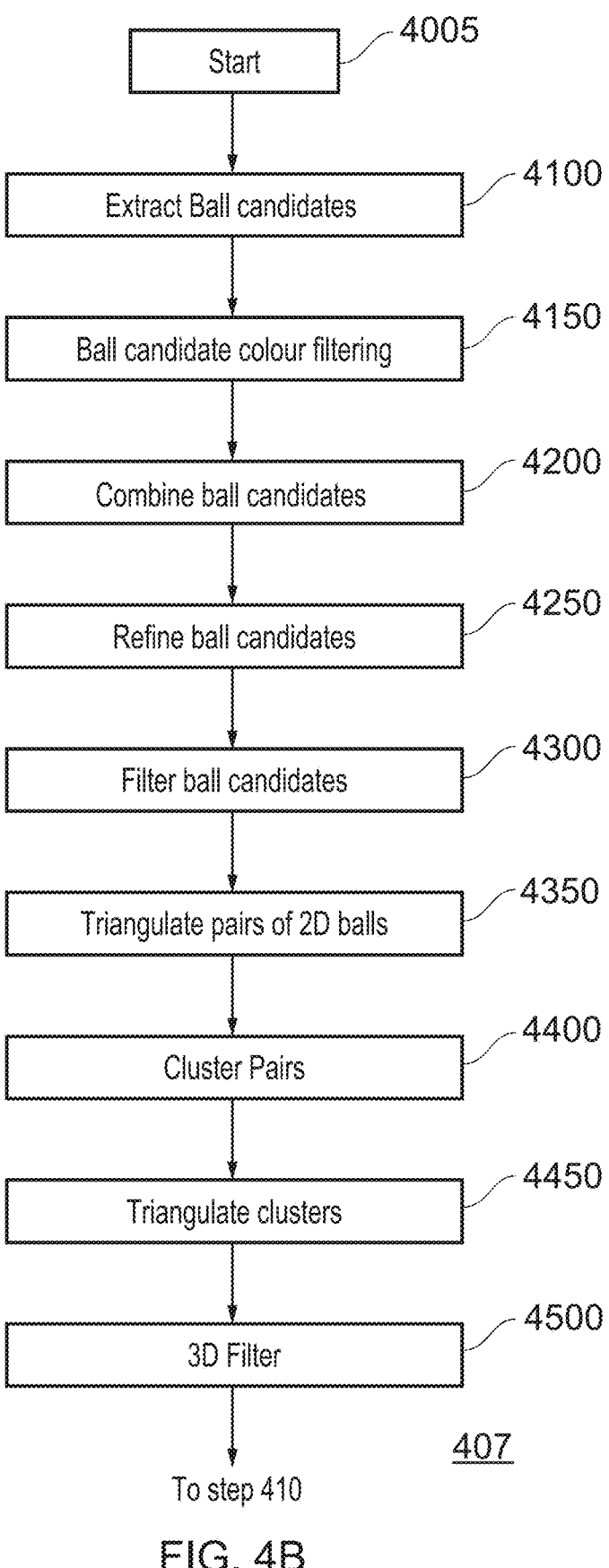
Figure 6A:
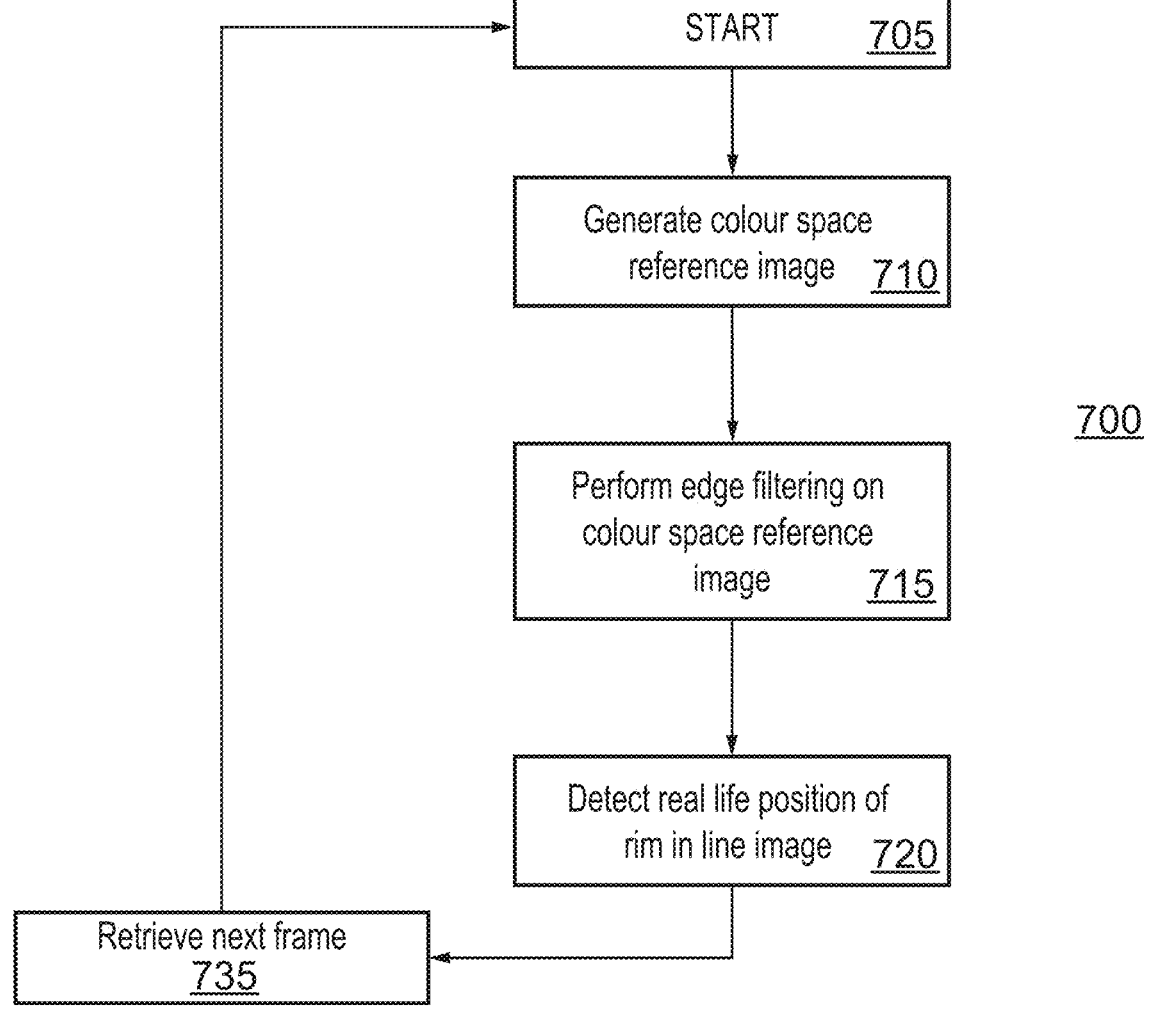
Figure 6B:
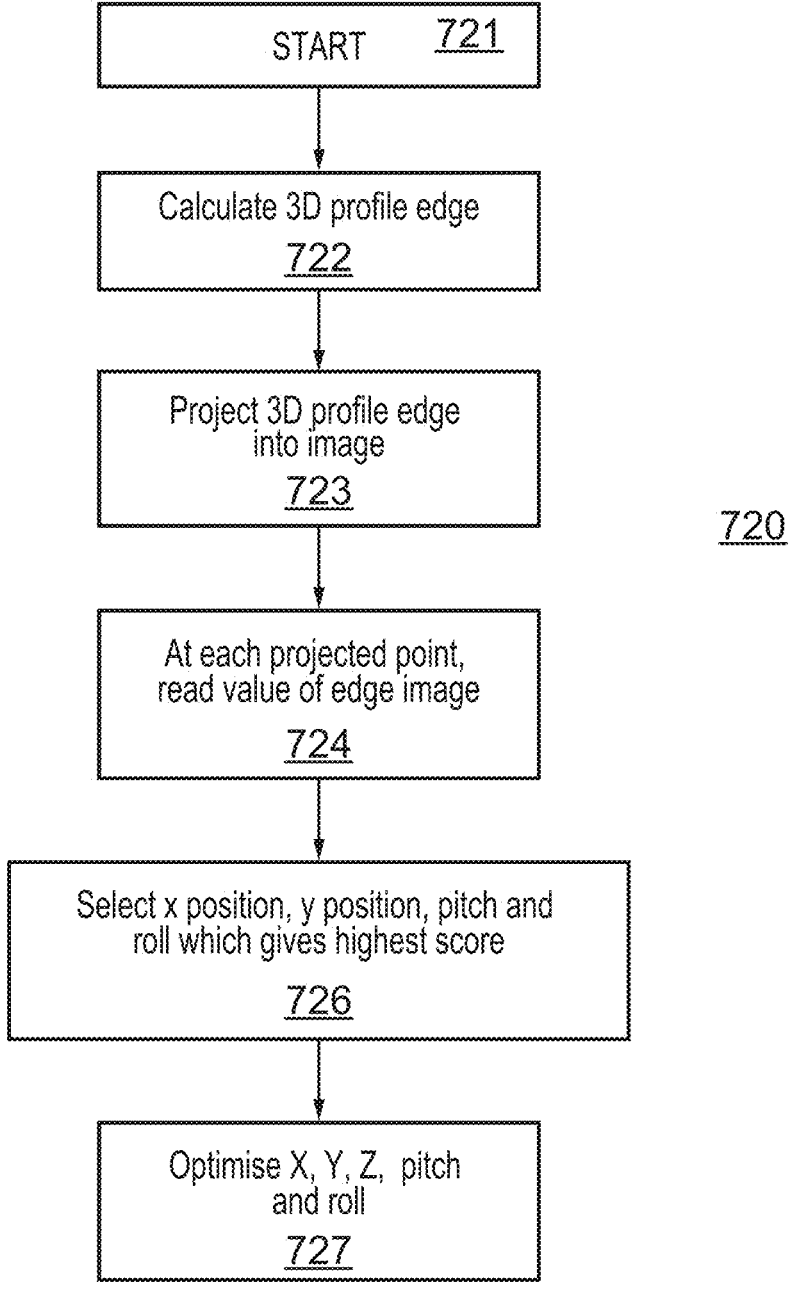
Figure 7:
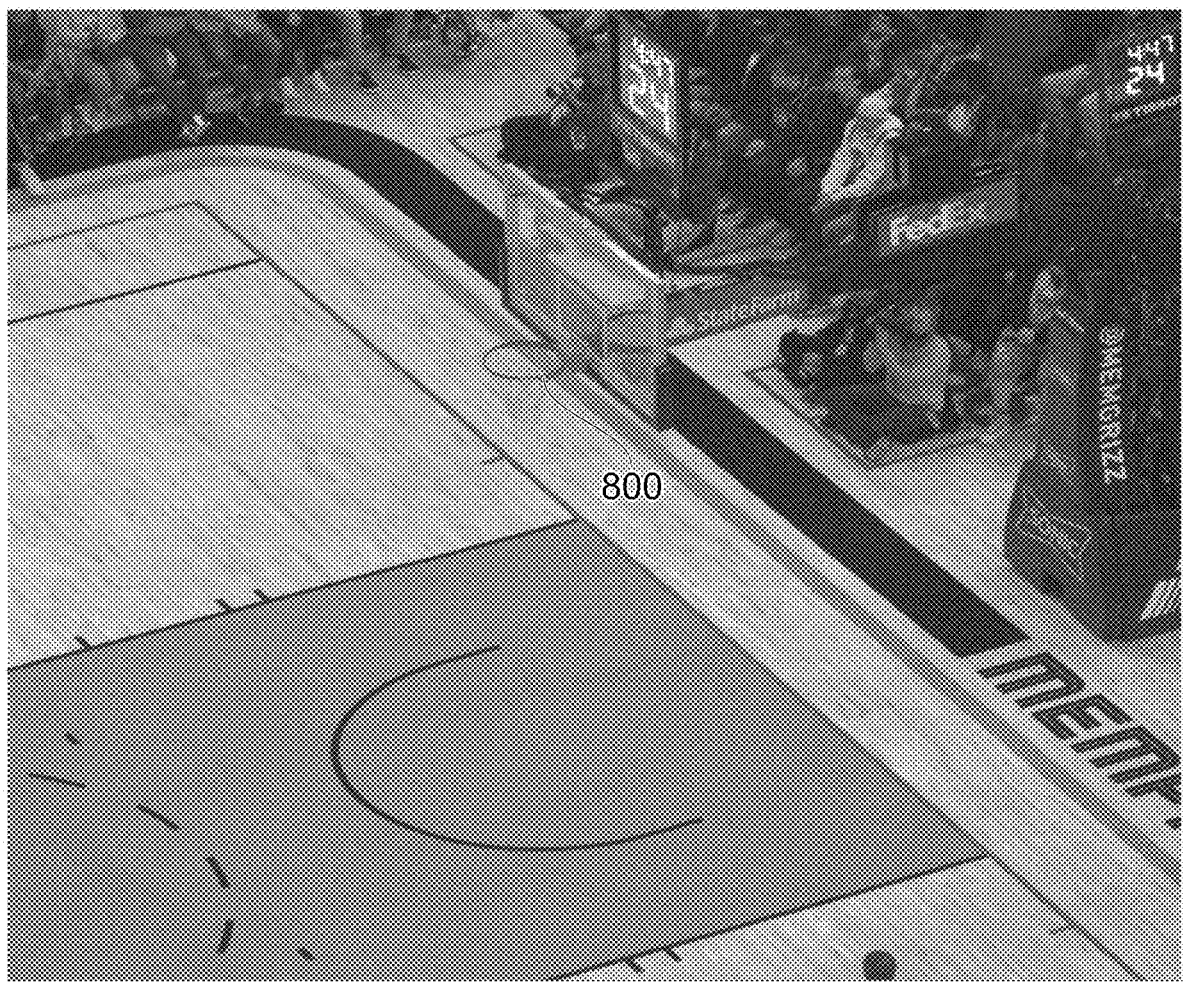
Figure 8:
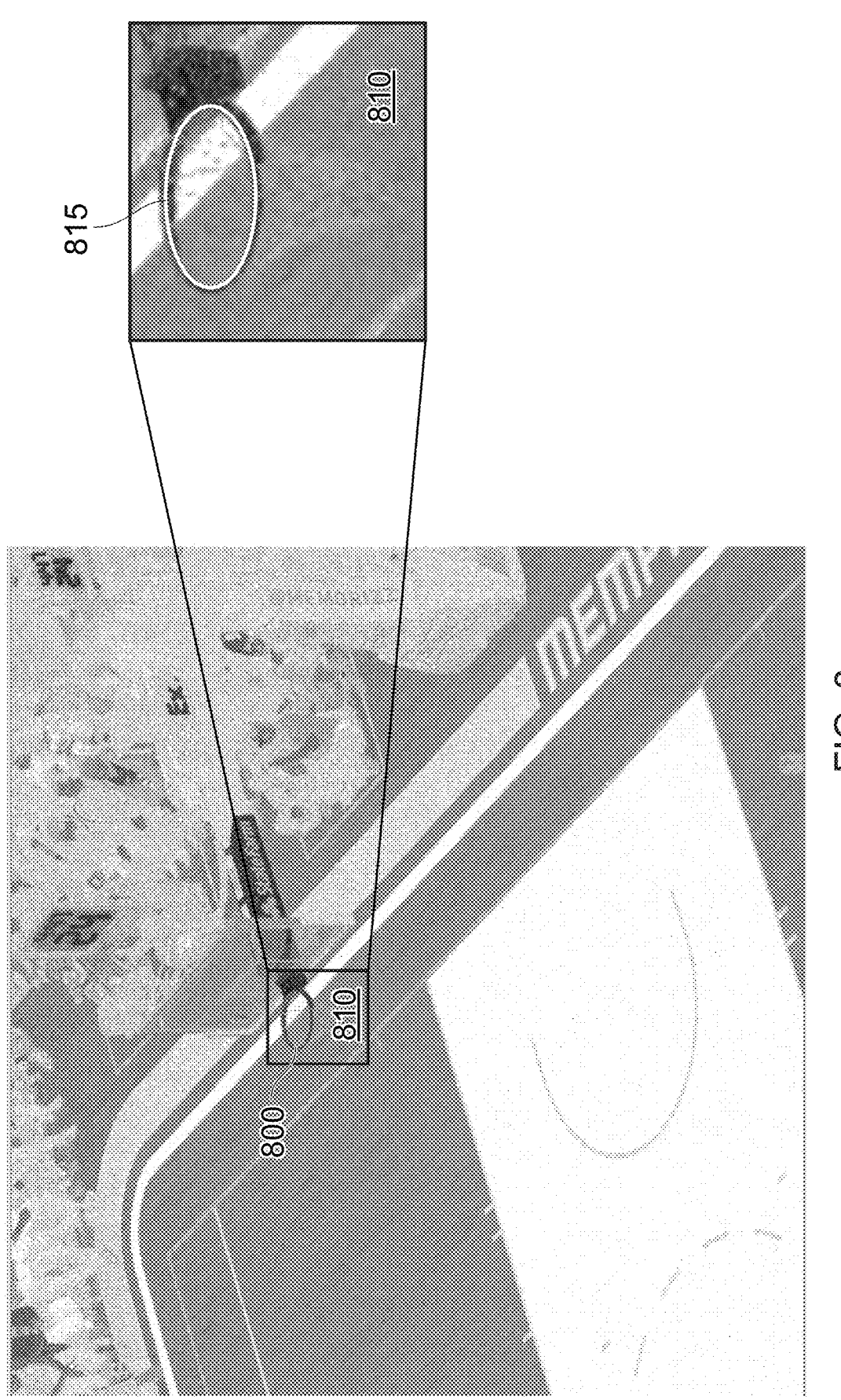
Figure 9:
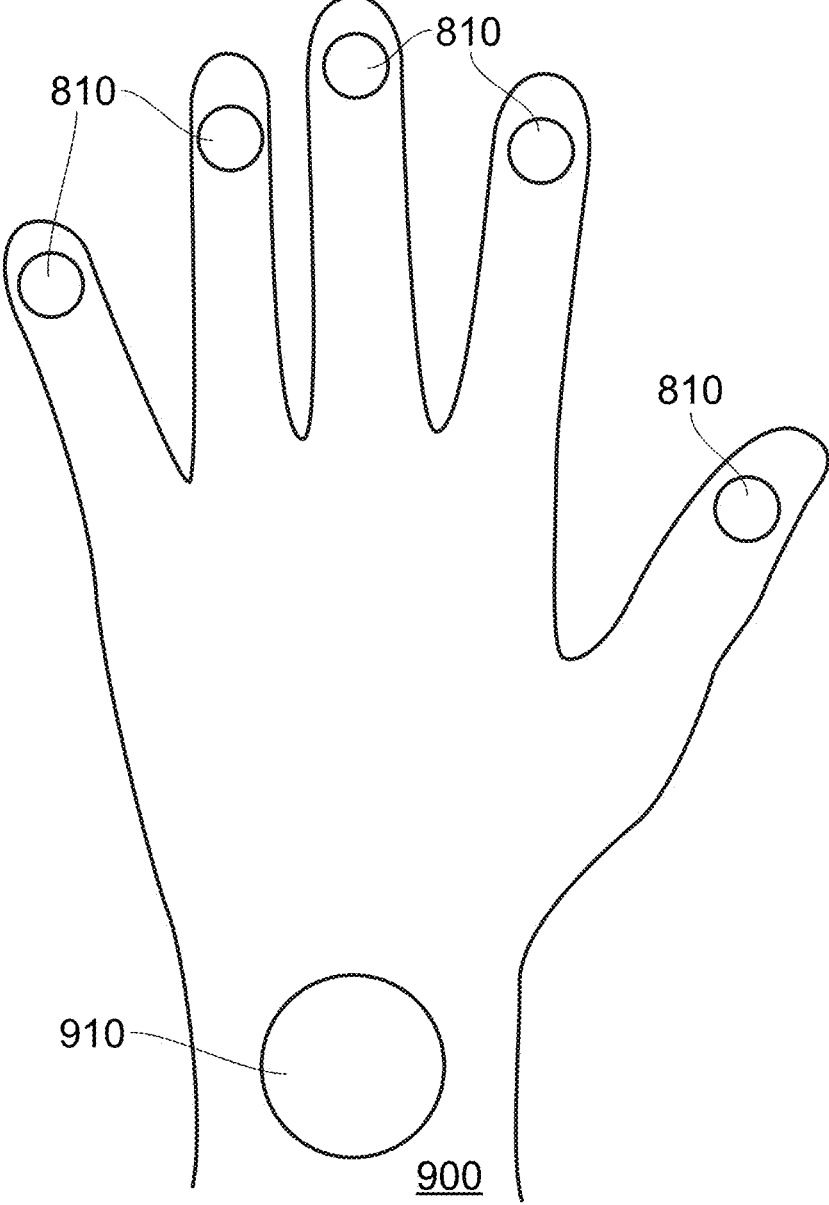
Figure 10:
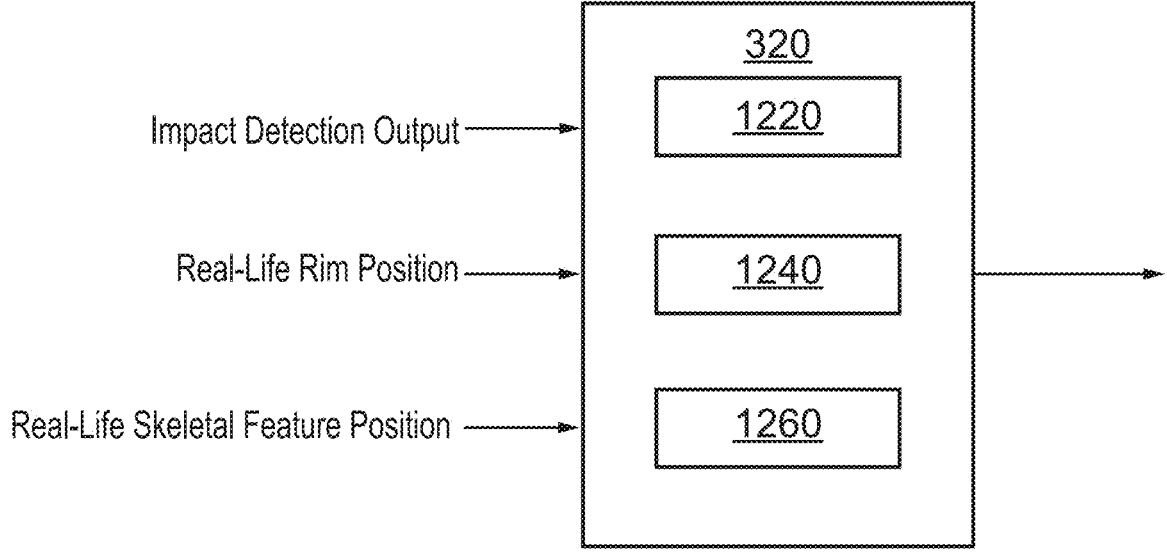

FIG. 3 shows an overall flowchart carried out in circuitry within the device according to embodiments of the disclosure;

FIGS. 4A and 4B show flowcharts explaining the impact detection according to embodiments of the disclosure;

FIGS. 5A to 5G show pictorially the impact detection according to embodiments of the disclosure;

FIGS. 6A and 6B show a flowchart explaining the rim detection according to embodiments of the disclosure;

FIGS. 7 and 8 show pictorially the rim detection according to embodiments of the disclosure;

FIG. 9 shows skeletal tracking according to embodiments;

FIG. 10 shows impact classification according to embodiments; and

Figure 11A:
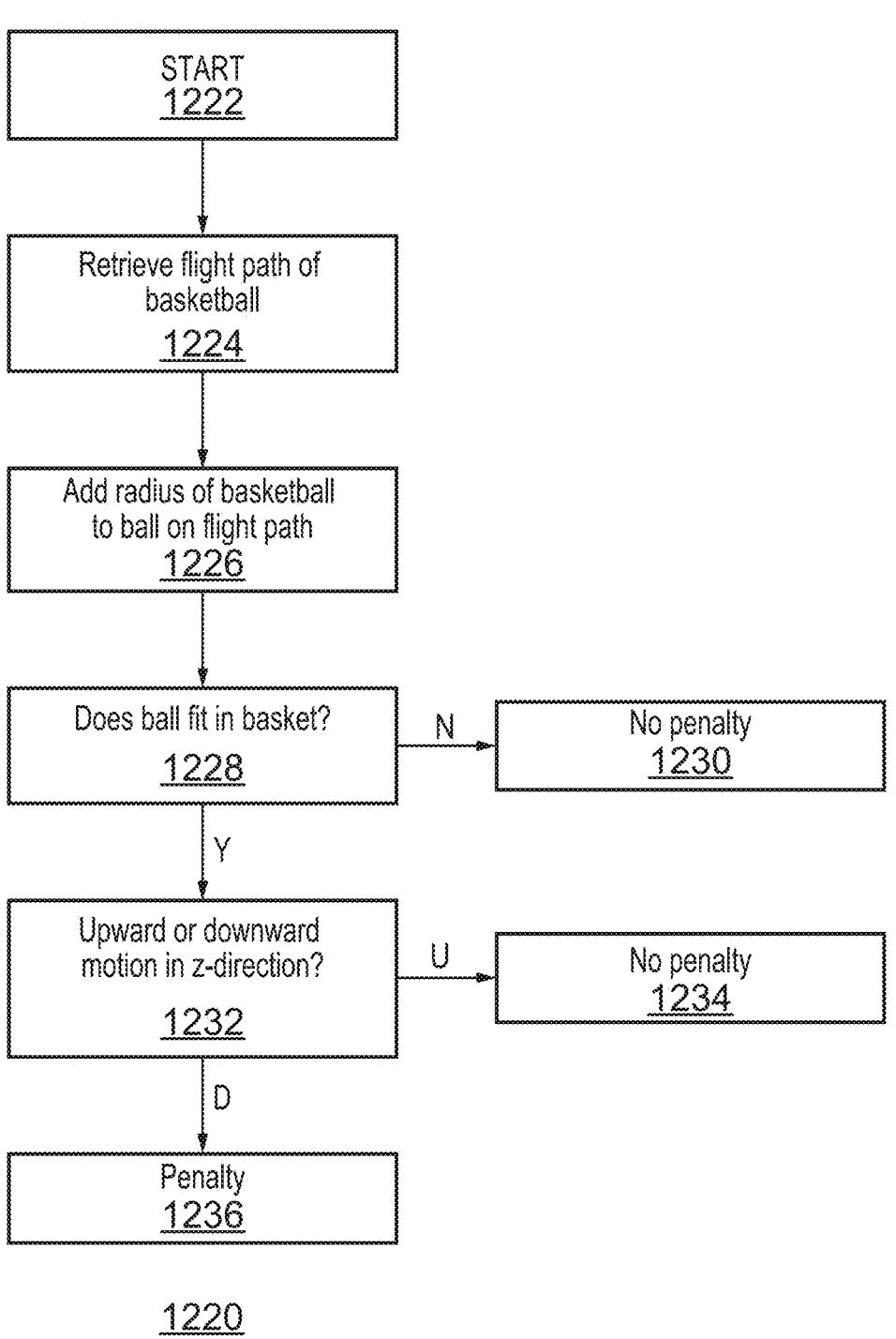

FIGS. 11A to 11O shows the impact classification process of FIG. 10 in more detail.

DESCRIPTION OF THE EMBODIMENTS

Referring now to the drawings, wherein like reference numerals designate identical or corresponding parts throughout the several views.

Numerous modifications and variations of the present disclosure are possible in light of the above teachings. It is therefore to be understood that within the scope of the appended claims, the disclosure may be practiced otherwise than as specifically described herein.

Figure 1:
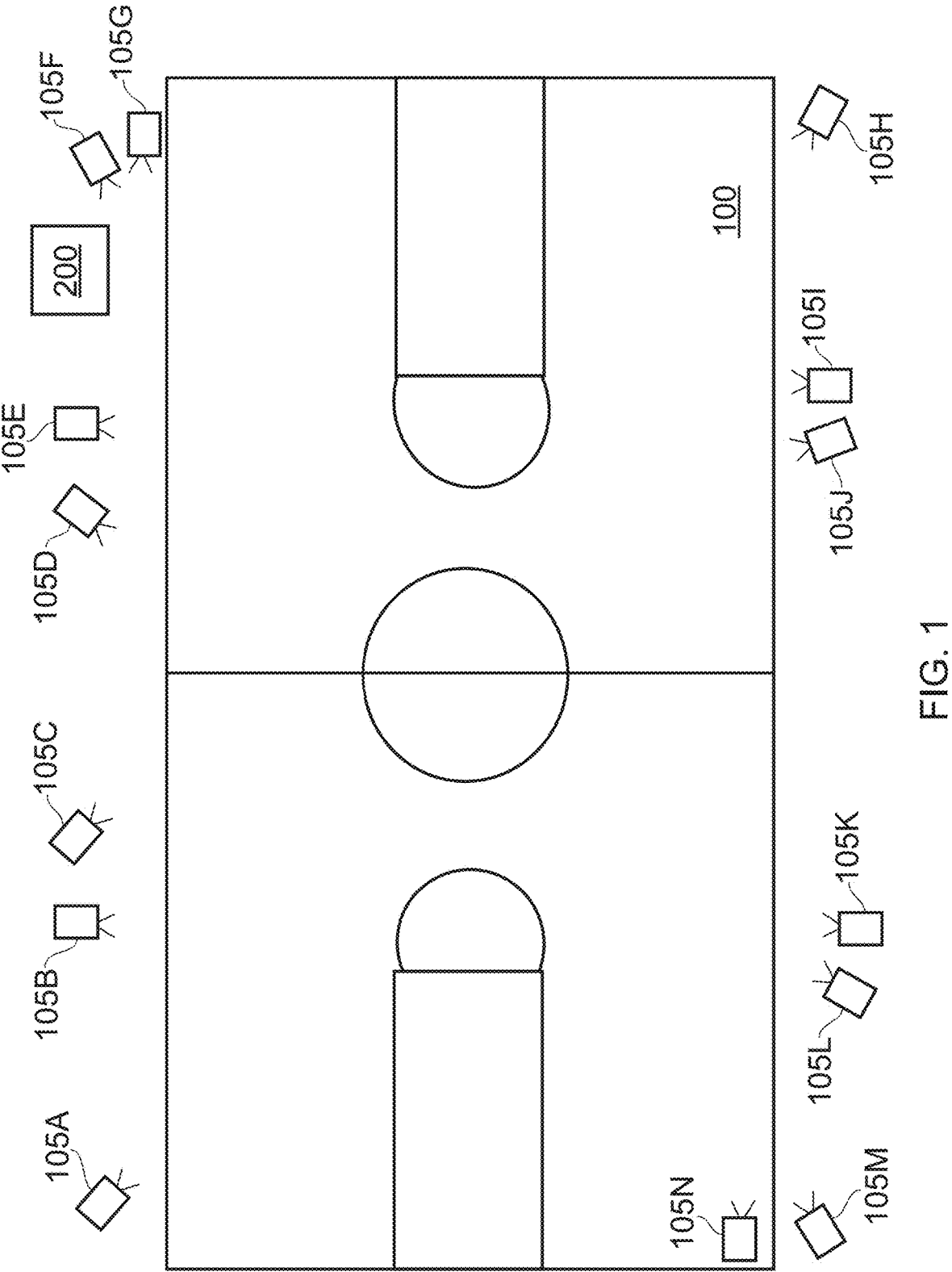
FIG. 1 shows a stadium containing cameras and a device according to embodiments of the disclosure.

Referring to FIG. 1, a stadium is shown. In embodiments, the stadium has a basketball court 100 located therein. The basketball court 100 is typically surrounded by spectator seats (not shown) and is enclosed either fully or partially by a roof. The basketball court 100 will have a game of basketball played thereon.

As will be appreciated, in basketball a ball is thrown between players with points being scored by the team in possession of the ball shooting the ball through a hoop. There are a number of infractions that players may commit and it is the purpose of the referee/umpire to identify these infractions. It is the aim of the disclosure to assist the referee/umpire to identify these infractions. Whilst the following is explained with reference to basketball, there are a number of games where the purpose of the game is to pass the ball between players and the team in possession to score points by shooting the ball through the hoop. One example of this is netball. Therefore, the disclosure is not limited to basketball and another ball game such as netball is also envisaged.

As will be explained later, embodiments of the disclosure require images to be captured and analysed during a basketball game to assist the referees in making decisions about infractions. These images will be captured by cameras 105A-105N located at various locations around the stadium. Of course, although 14 cameras are shown in FIG. 1, the disclosure is not so limited and more or less cameras are envisaged.

In embodiments, each camera captures an RGB image at roughly higher than 4K resolution (typically 4096×2960) at a frame rate of 60 frames per second (fps). This forms a video stream. The disclosure is not so limited to a particular resolution and any appropriate resolution is envisaged. Further, in embodiments, each camera has a focal length and a field of view directed to a different, but overlapping, part of the basketball court 100. In embodiments, the focal length on each camera may be different. For example, camera 105M has a field of view of the hoop on the right hand side of the basketball court 100 with a high level of zoom and camera 105H has a field of view of the hoop on the left hand side of the basketball court 100 with a high level of zoom. By contrast, camera 105B has a wide angle field of view of the left hand side of the basketball court 100 and camera 105I has a wide angle field of view of the right hand side of the basketball court 100.

The number and positioning of the cameras may vary. However, the real-life position of an object on the basketball court is determined from the captured images. In embodiments this may be a basketball, basketball player, basketball rim or the like. Therefore, it is necessary to map any real-life point on the basketball court to a pixel in the captured image. In other words, it is necessary to map any real-life point on the basketball court to a pixel in the captured image. This mapping is carried out during a calibration stage. The positioning of the cameras, the determination of the field of view of each camera and calibration of the cameras and the mapping of real-life points on the basketball court to pixels in the captured image is known and so will not be described any further. This is a known technique, but one technique for mapping is described in EP2 222 089A, the contents of which is hereby incorporated by reference.

Although not shown in FIG. 1, each of the cameras 105A-105N are connected over a network which may by an Internet Protocol (IP) network or a Serial Digital Interface (SDI) network. This connection may be a wired or wireless connection. Additionally connected to the network is a device 200 according to embodiments of the disclosure. The device 200 is described with reference to FIG. 2. However, the device 200 receives the images captured by each of the cameras 105A-105N and analyses those images to produce an output which assists the referee in officiating the basketball game as will be explained.

Figure 2:
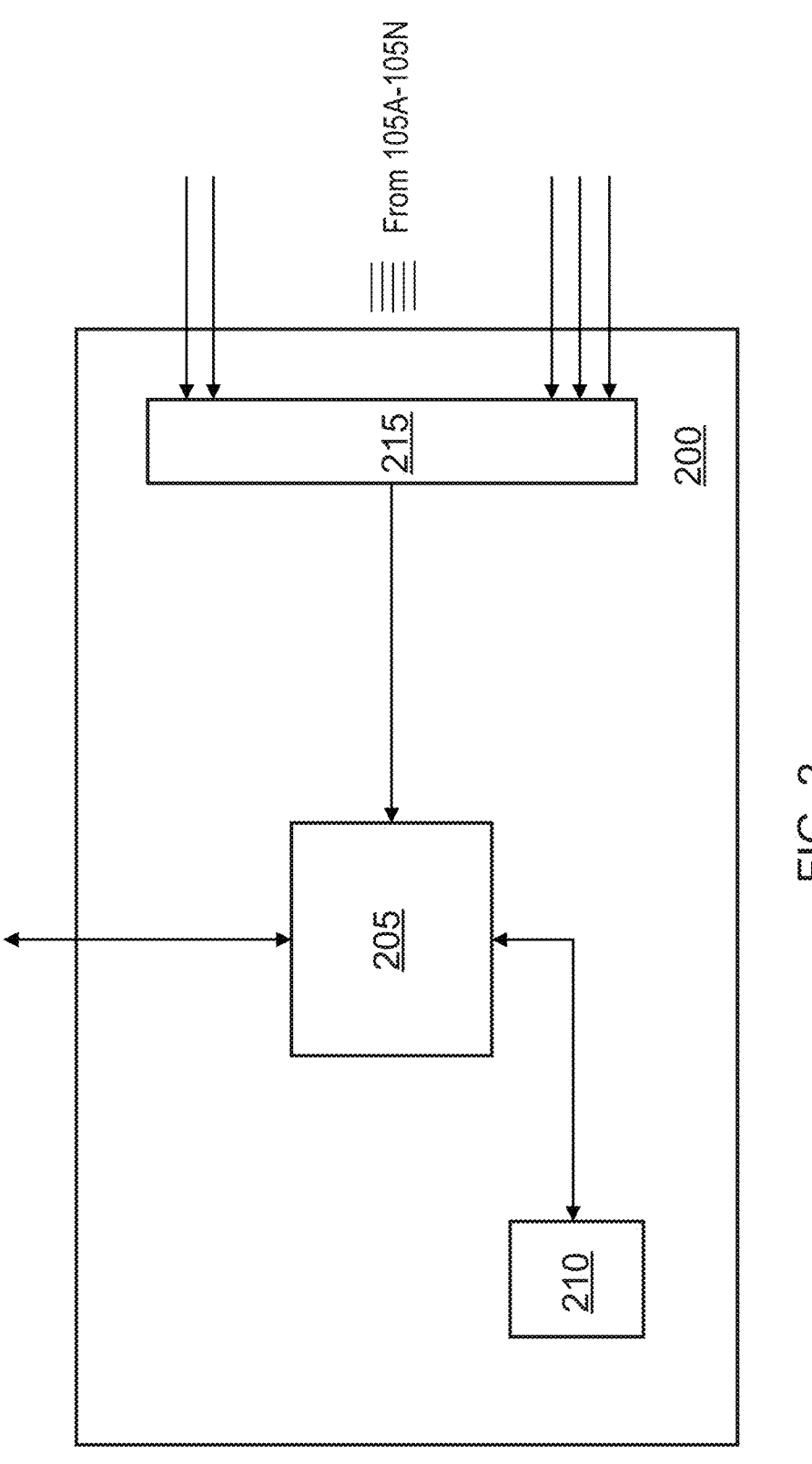
FIG. 2 shows a device according to embodiments of the disclosure.

Referring to FIG. 2, the device 200 according to embodiments of the disclosure is shown. The device 200 includes circuitry that is configured to perform the method according to embodiments. In particular, the circuitry may be one or more pieces of circuitry.

The images captured by cameras 105A-105N which form the video stream are fed into camera interface 215. Camera interface is configured to receive the images captured by cameras 105A-105N and to provide these images to processing circuitry 205. Processing circuitry 205 may be an Application Specific Integrated Circuit (ASIC) or may be integrated circuitry which operates under the control of computer software. In embodiments, the computer software contains computer readable instructions, which when loaded onto a computer, configures the computer to perform a method according to embodiments. This computer software may be stored within storage medium 210. Storage medium 210 may be magnetically readable, optically readable or may be solid state memory that is configured to store software.

The processing circuitry 205 is configured to output a signal (which is an indication that a goaltending event has been detected) to the referee to assist in officiating the basketball game. As will be explained, this signal indication may be a video clip that can be reviewed by the referee, a time segment of a stored video clip which may be retried from a store or may be a decision indicating a foul has occurred. In the event that the video clip or the time segment within a stored video clip is output, the playback of this clip may be controlled by the referee. For example, the referee may control the speed of playback or the direction of playback (i.e. by scrubbing or seeking the video clip). By outputting the indication, the referee will be assisted in officiating the basketball game.

Overall Method According to Embodiments

Referring to FIG. 3 that shows a flowchart 300 explaining the method according to embodiments of the disclosure. The steps of flowchart 300 will, in embodiments, be carried out in the processing circuitry 205.

Overall embodiments of the disclosure identify from the captured images a goaltending event. Goaltending is an infraction in basketball. In goaltending, a player from the defending team interferes with the basketball while it is on its way to the basket or by interfering with the basket rim itself.

Whilst there are several scenarios that result in a goaltending, the three that are sometimes considered to be difficult to officiate are Rule 11.b. of the NBA Rules which states "A Player Shall Not: Touch any ball from within the playing area when it is above the basket ring and within the imaginary cylinder"; Rule 11.f which states "A Player Shall Not: Touch any ball from within the playing area that is on its downward flight with an opportunity to score. This is considered to be a "field goal attempt" or "trying for a goal" and Rule 11.h which states "A Player Shall Not: . . . bend or move the rim to an off-center position when the ball is touching the ring or passing through".

In embodiments, therefore, the real-life position of the basketball is determined so that motion of the basketball may be found. This is useful because a change in direction of the motion may indicate that the basketball has been impacted by an event such as an interference by the defending player contrary to the goaltending rules of basketball. This is step 315 and will be described with reference to FIGS. 4A to 5G.

Moreover, the position and orientation of the rim of the basketball basket is determined and tracked. This is useful to determine if the basketball rim is interfered with during the game and thus whether a possible goaltending violation has occurred. This is step 310 and will be described with reference to FIGS. 6A-8. In order to determine the real-life position of the basketball on the basketball court, the basketball first has to be detected in each of the images from each of the cameras.

In order to achieve this, object detection must be performed on each image to try and detect the presence of a basketball. There are many techniques for performing object detection. However, as the images are captured at 60 frames a second and the resolution of the captured images is 4096×2960 pixels, it is necessary to carefully select the object detection technique in order to quickly yet accurately detect the position of the basketball in each image. The technique for performing object detection to detect the position of the basketball will be described with reference to FIG. 4B. Although one particular technique is described with reference to FIG. 4B, the disclosure is not so limited and other techniques such as a standalone neural network technique such as a "You Only Look Once" (YOLO) model may be utilised as would be appreciated by the skilled person.

In embodiments, the object detection is performed on the images captured by each of the cameras.

Once the position of basketball candidates have been detected in each captured image, the 3D centre of the basketball is determined. The reason the 3D centre of the basketball is determined is that the 3D centre is rotationally invariant. This is achieved by assuming that the position of the centre of the real ball is the same as the centre of the projection of the profile edge of the 2D basketball. Moreover, as the circumference of the basketball is known (an adult size 7 basketball has a circumference of 75 cm), its radius is also known. Therefore, by determining the centre of the basketball the real-life position of the outer surface of the basketball is also known.

Finally, the real-life position of a player or part of a player is determined. In embodiments, the real-time position of one or more skeletal features is determined. A skeletal feature is a body part of a player closest to the basketball at the time of impact. In embodiments, the skeletal feature may be a wrist, a hand or finger, or any part of the body which may cause interference on the ball if the ball is touched by defending player. This is step 305 and will be described with reference to FIG. 9. Moreover, in order to determine the team of the players, the player's jersey (which can be extracted from knowledge of the players pose) is compared to references for each team that are gathered prior to the match. Both Machine learning techniques and traditional techniques such as colour histograms are used. The number on the jersey is also determined using machine learning techniques and this is used to identify a specific player. A combination of these techniques both on a single frame and using tracked history, is used to establish whether the player who performs an alleged infraction is on the defending team. In instances, facial recognition or number recognition may be used to identify the player. This may be in addition to or in replacement of the player's jersey.

The output of the impact detection on the basketball, the real-life rim position and the real-life skeletal feature position detection are fed to an impact classification step. This is step 320 and will be described with reference to FIG. 10.

It should be noted that to detect whether a goaltending event has taken place, the impact classification needs the real-life position of the basketball and the detected impact. From this information as will be apparent, a goaltending event may be detected. The output from the impact classification step provides the indication to the referee noted above.

Whilst the above describes the goaltending violation as being determined using impact detection on the basketball, the real-life rim position and the real-life skeletal feature position detection, the disclosure is not so limited and detection of an impact or movement on the back-board may also be used. This impact or movement may be determined from images captured by one or more cameras 105A-M or may be determined from captured audio. In the instance of audio, a player or basketball hitting the back-board will make a distinctive sound which may be captured by a microphone or other transducer placed near to or onto the back-board.

In the instance that a goaltending event is identified, the output indication is provided to the referee. Moreover, in addition or instead, the output indication may be provided to a content provider. This content provider may be an online content provider, a broadcaster or maybe even a provider providing video footage within the stadium (for example on a large screen). Indeed, the output indication may allow the auto-generation of a clip of video footage which may be provided to an audience (such as a home or stadium audience) or a video-referee for review.

Impact Detection

As noted above, impact detection is described with reference to FIGS. 4A and 4B and 5A to 5G.

Referring to FIG. 4A, a flowchart 400 explaining the impact detection is shown. The flowchart starts at step 405. The process then moves to step 407 where object detection is carried out. Specifically, in step 407, the images captured by the various cameras are analysed to detect possible basketballs in the image (referred to hereinafter as "candidate basketballs"). In other words, the output of the object detection step 407 is the real-life position of possible basketballs detected within the captured images. The object detection step 407 is explained with reference to FIG. 4B.

Referring to FIG. 4B, the object detection process 407 begins at step 4005. The process then moves to step 4100 where candidate basketballs are detected in the image captured by each camera. In particular, a hybrid approach is used in embodiments of the disclosure of a quick method on each frame and a slower method on every other frame (i.e. every two frames). This reduces the likelihood of not detecting the real location of the basketball from the detected candidate basketballs whilst ensuring that the use of the processing circuitry 205 is efficient.

In embodiments, the slower technique is machine learning, where every other frame of video is processed using a trained model to detect the presence of basketball candidates. The quick method uses a more brute-force approach. Specifically, for every pixel in the image, a test is carried out to see if the pixel is the centre of a candidate basketball. Of course, although a hybrid approach is described hereinafter, the disclosure is not so limited and object detection may be carried out using machine learning only or a brute-force approach only.

In order to use the hybrid approach, circles (which are the approximate 2D shape of a basketball) having different radii are placed over the pixel under test (the pixel being at the centre of each concentric circle). At a number of points on each circle, a check is made to see if there is a circle in the image. In embodiments, the number of points is 32 distributed along the circumference of the circle. In order to do this, analysis of the image is carried out to see if there is an edge of a circle at each point. In particular, the direction of any edge and the strength of the edge is analysed. Where the direction of the edge is approximately perpendicular to the tangent of the circle along the number of points, this provides an indication that the pixel is the centre of a basketball. A score is then applied to each pixel which indicates the likelihood of each pixel being the centre of a basketball. Pixels which have a probability above a threshold are defined as a candidate basketball. It is possible to bound the number of candidate basketballs such that only candidate basketballs have a probability higher than a predefined probability of, say, 60% will be defined as a candidate basketball or only the top, say, 100 candidate basketballs will be passed through to the remainder of the process. Of course, any particular bounding may take place.

The process moves to step 4150. In step 4150, colour filtering on the candidate basketballs is carried out. In this step, the candidate basketballs are checked against the expected colour of the basketball and those whose colour of a certain proportion of pixels within the candidate basketball do not match the expected colours are removed as candidate basketballs. For example, all candidate basketballs which have less than 50% of pixels matching the expected colour of a basketball are removed as candidate basketballs. This is a particularly advantageous step to remove detected heads of players, officials and the audience as the real-life size of the basketball is similar to that of an adult person and form a large number of candidate basketballs found in step 4100.

The process moves to step 4200 where the candidate basketballs found in the machine learning and the quicker method described above are combined in the frames where both techniques are used. In other words, a check is carried out which compares the detected positions of candidate basketballs found in each method; where there is no match the candidate basketball is removed.

The step then moves to step 4250 where each remaining candidate basketball has a further refinement step carried out. Specifically, the process carried out on each frame in step 4250 is repeated for all pixel positions along the circumference of the candidate basketballs. In other words, in step 4250 the process is carried out for a subset of points along the circumference (in embodiments 32 points) whereas in step 4250 the process is carried out for all pixel positions along the circumference of the candidate basketball.

The output of step 4250 is the x,y position of the centre pixel of each candidate basketball in each frame, the radius of the candidate basketball and the probability of the candidate basketball in the image being the basketball in the image is also output from step 4250.

The process moves to step 4300. In step 4300, candidate basketballs located at certain positions within a frame may be ignored. For example, in the instance where an image contains an advertising board where the real-life basketball cannot be located, candidate basketballs in this area of the image are ignored. This reduces the number of candidate basketballs. Similarly, other filtering techniques such as candidate basketballs having a probability less than a predetermined amount may also be ignored.

The process moves to step 4350. In step 4350 every candidate basketball is paired, and triangulated, with the candidate basketballs from different cameras whose angle between the two rays from camera to ball centre pixels is greater than a chosen threshold such as 15°. This allows the 3D position of each pair of candidate basketballs to be determined.

The process moves to step 4400. In step 4400 the triangulated pairs of candidate basketballs whose 3D positions are close together (i.e. where the distance between the candidate basketballs is below a threshold) are clustered into groups.

The process then moves to step 4450 where the clusters derived in step 4400 are triangulated. This allows the best combination of candidate basketballs to be found and for poor candidate basketballs to be removed. As would be appreciated by the skilled person, there are a number of scoring criteria that can be used. For example, the scoring criteria may be selected to minimise or at least reduce the re-projection errors (given a maximum 2D error). Additionally, it is possible to apply a higher score to each 3D candidate basketball which is present in an image from many cameras.

The process moves to step 4500 where a 3D filter is applied to the remaining candidate basketballs. In particular, the candidate basketballs that are outside the field of play are removed, or where the radius of the candidate basketball is different from the known basketball radius by a predetermined amount. The candidate basketballs not matching the filter are removed.

The process then moves to step 410.

In step 410 a piecewise curve through the real-life position of the candidate basketballs in consecutive frames is used to give a trajectory of the basketball in a given frame. This will be used to detect initial rebounds. This will be explained with reference to FIGS. 5A-5G.

Figure 5A:
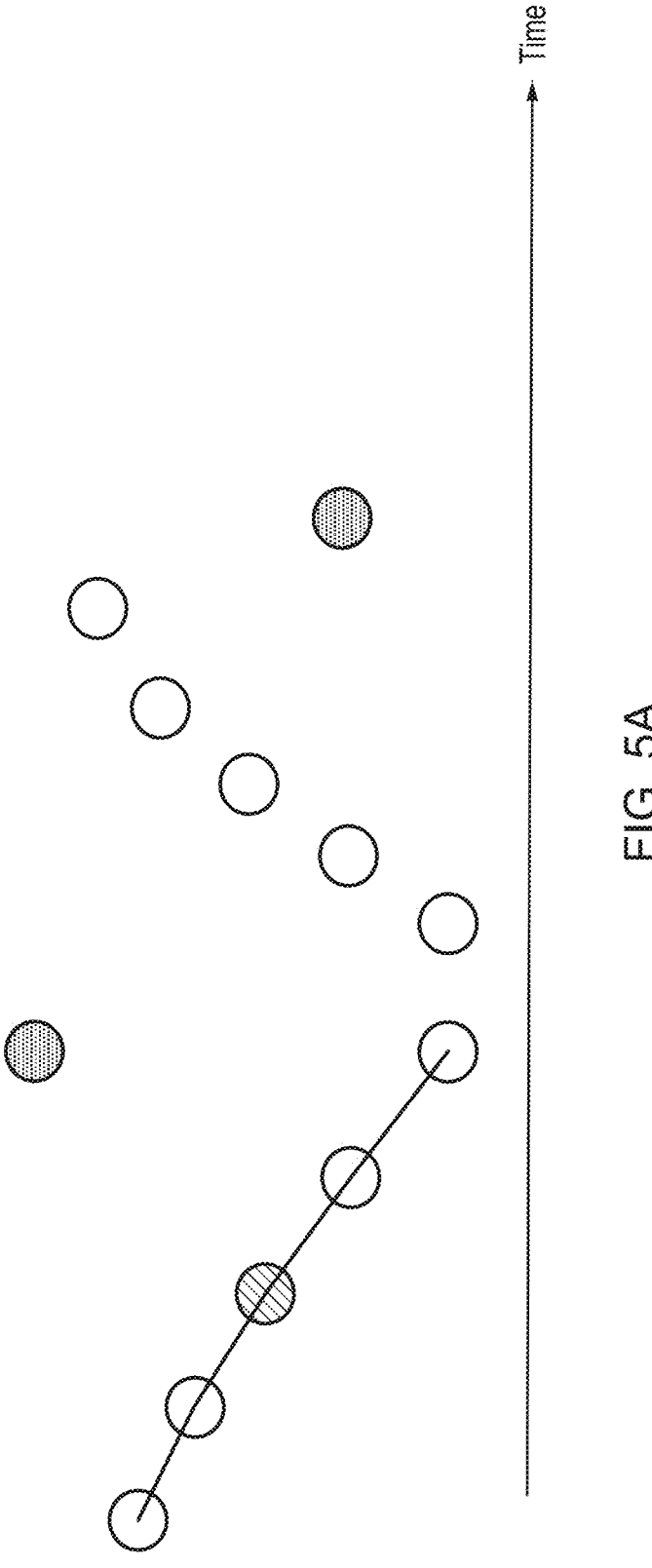

Looking at FIG. 5A, a candidate basketball is tracked for 10 frames of video. The real-life position of the basketball in each consecutive frame is shown overlaid on a single time axis for ease of explanation. It should be noted that other candidate basketballs will also be present in each frame. These other candidate basketballs are noise. These are shown for illustrative purposes in a small checkerboard pattern in FIG. 5A to FIG. 5G.

For each frame time, a curve is fitted through the points in the two frames prior to the frame time and the two frames subsequent to the frame time. It should be noted that, in embodiments, the curve must fit through four points although this number is exemplary. In embodiments, the curve is fitted using a random sample consensus (RANSAC) technique. When using the RANSAC technique, the two candidate basketballs with the small checkerboard pattern are ignored as they do not fit to a curve. In FIG. 5A, the most promising basketball candidate that does fit to a curve in the frame time t is shown with hatching. Accordingly, the piecewise curve is shown drawn through the real-life position of the basketball candidate in the two frames previous to the frame f and the two frames after the frame f.

Figure 5B:
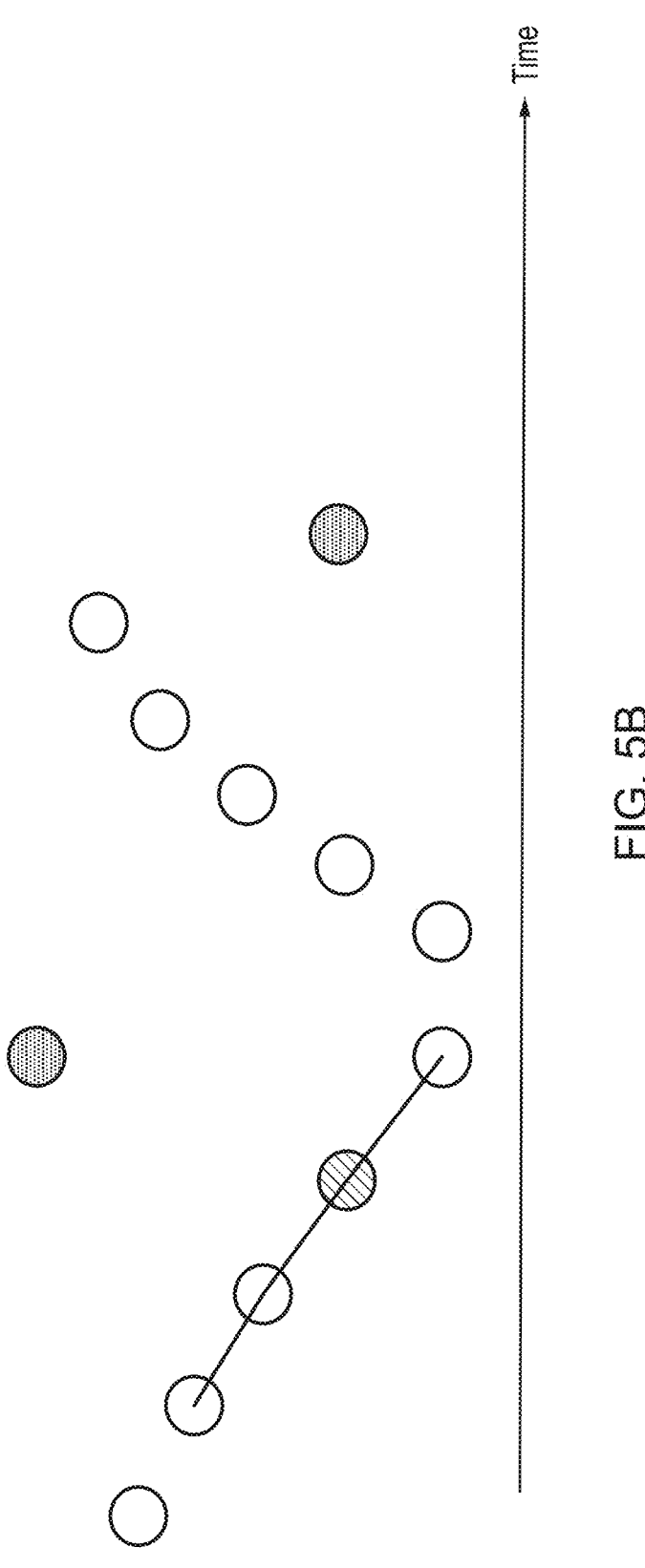
Figure 5C:
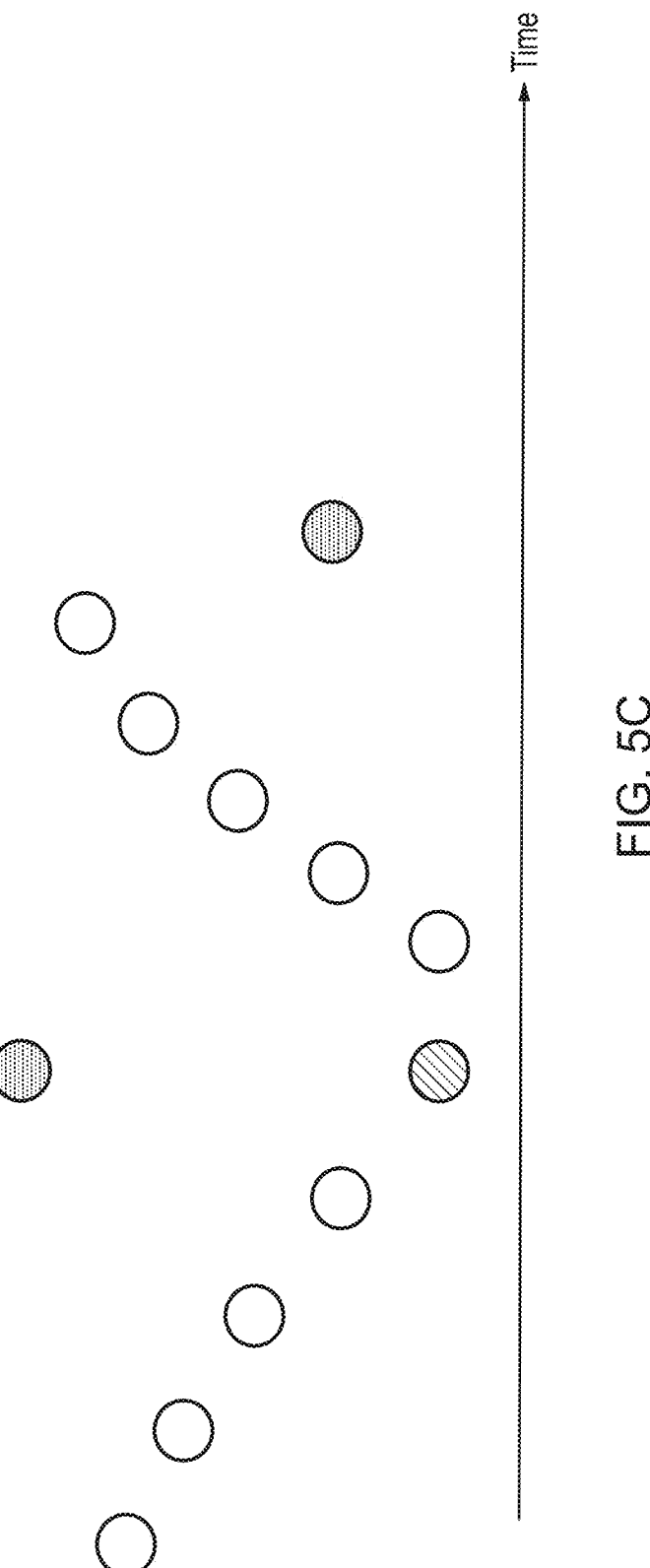

In FIG. 5B, the real-life position of the basketball candidate for frame f+1 is determined. Again the real-life position of the basketball candidate in frame f+1 is shown with hatched lines. As the curve can fit through four points a curve fitting through four points is drawn as shown in Figure embodiments, the curve is a polynomial, though the disclosure is not so limited. This means that the impact is detected based upon the deviation of movement of the basketball from a polynomial path In FIG. 5C, the real-life position of the basketball for frame f+2 is determined. Again the real-life position of the basketball in frame f+2 is shown with hatched lines. As no curve fits the real-life position of the basketball in four frames due to a deflection (i.e. no curve fits through four points in FIG. 5C), no piecewise curve can be fitted.

Figure 5D:
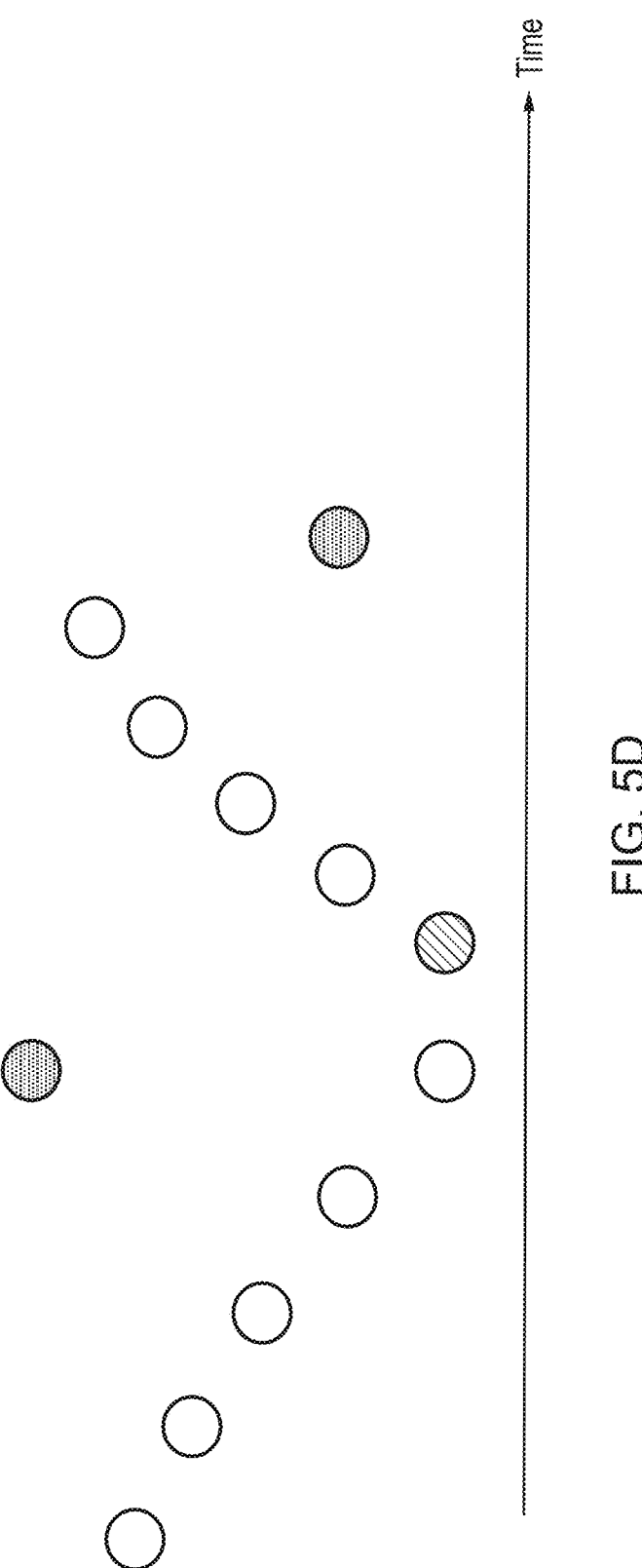

In FIG. 5D, the real-life position of the basketball for frame f+3 is determined. Again the real-life position of the basketball in frame f+3 is shown with hatched lines. As no curve fits the real-life position of the basketball in four frames due to a deflection, no piecewise curve can be fitted.

Figure 5E:
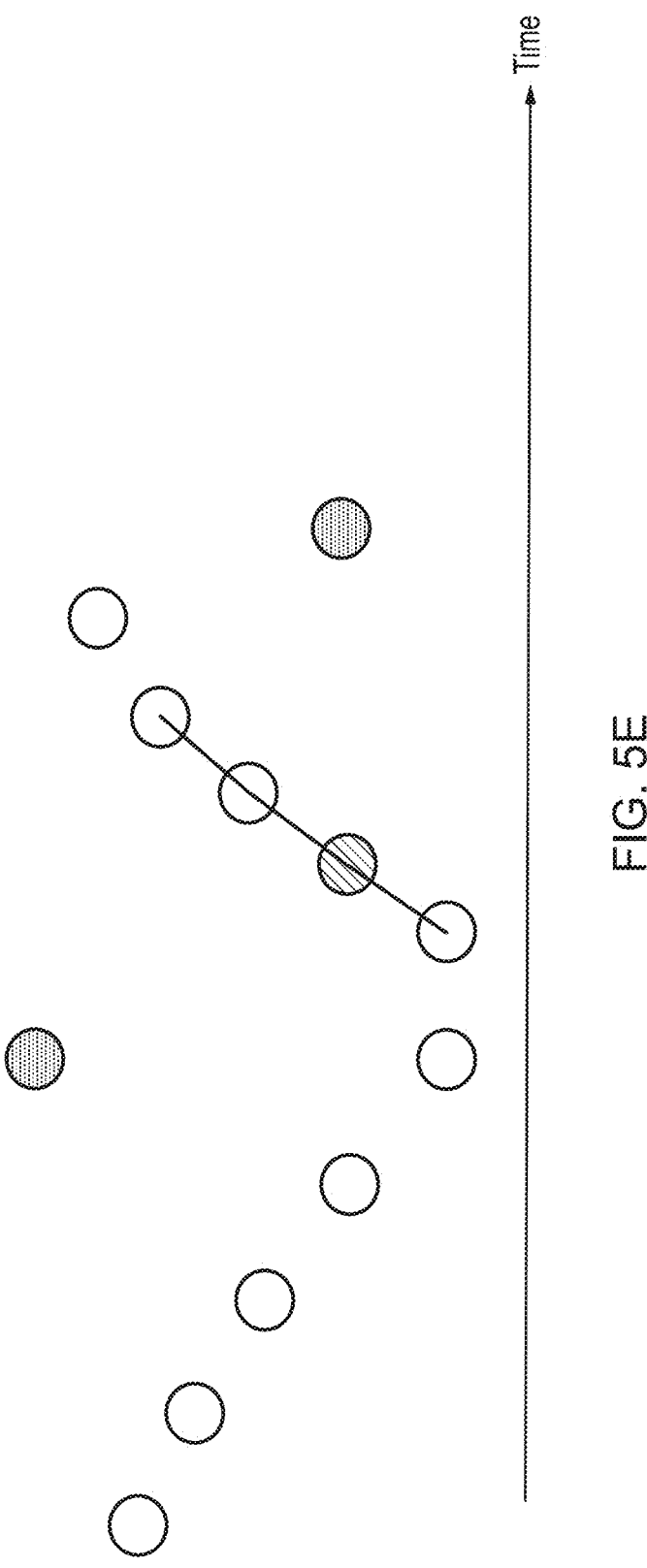

In FIG. 5E, the real-life position of the basketball for frame f+4 is determined. Again the real-life position of the basketball in frame f+4 is shown with hatched lines. As the curve can fit through four points a curve fitting through four points is drawn as shown in FIG. 5E.

Figure 5F:
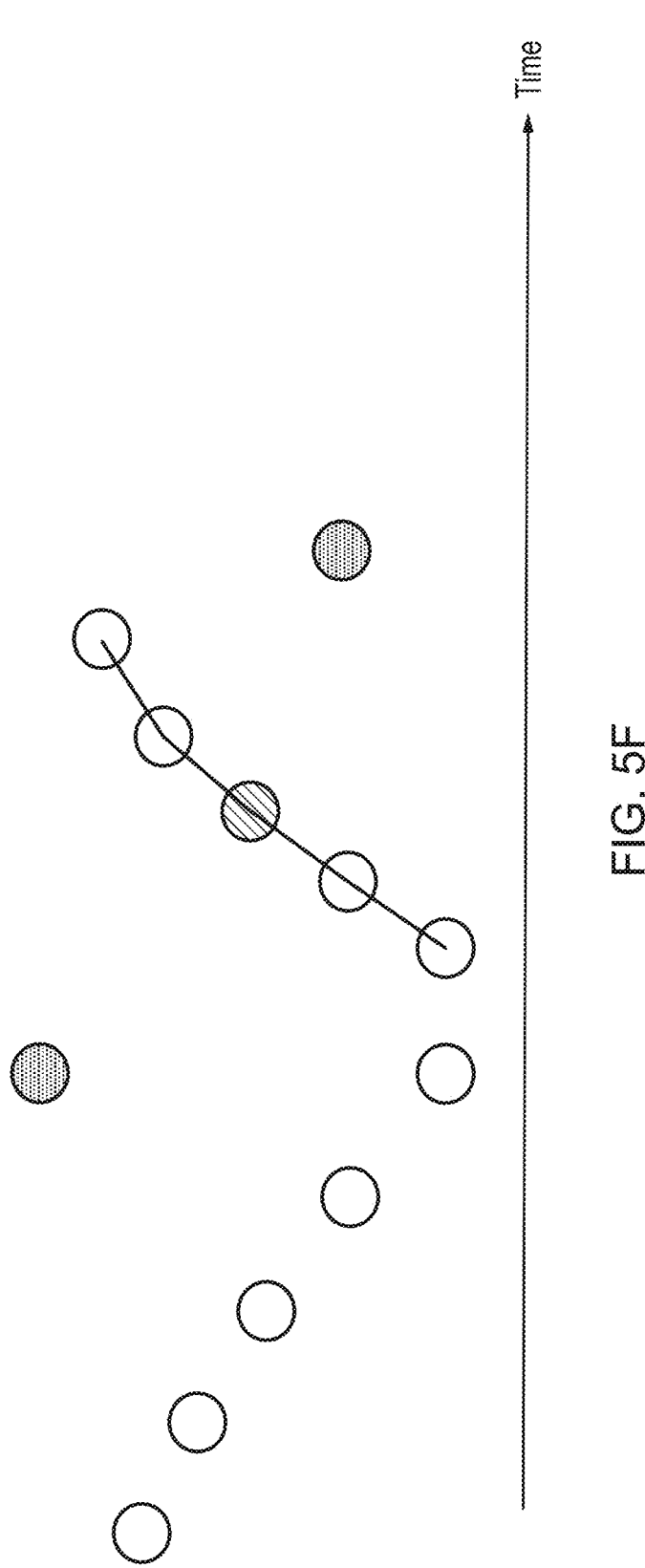

In FIG. 5F, the basketball in the frame f+5 is shown with hatching. Accordingly, the piecewise curve is shown drawn through the real-life position of the basketball candidate in the two frames prior to the frame f+5 and the two frames after the frame f+5.

As noted, in instances, it is not necessary for a piecewise curve to be fitted through all 5 real-life positions of the basketball candidates and that the piecewise curve may be fitted through 4 real-life positions.

After the piecewise curves have been determined for the basketball motion over the frames f to f+5, the process moves to step 415 where the initial rebounds of the basketball are determined.

Figure 5G:
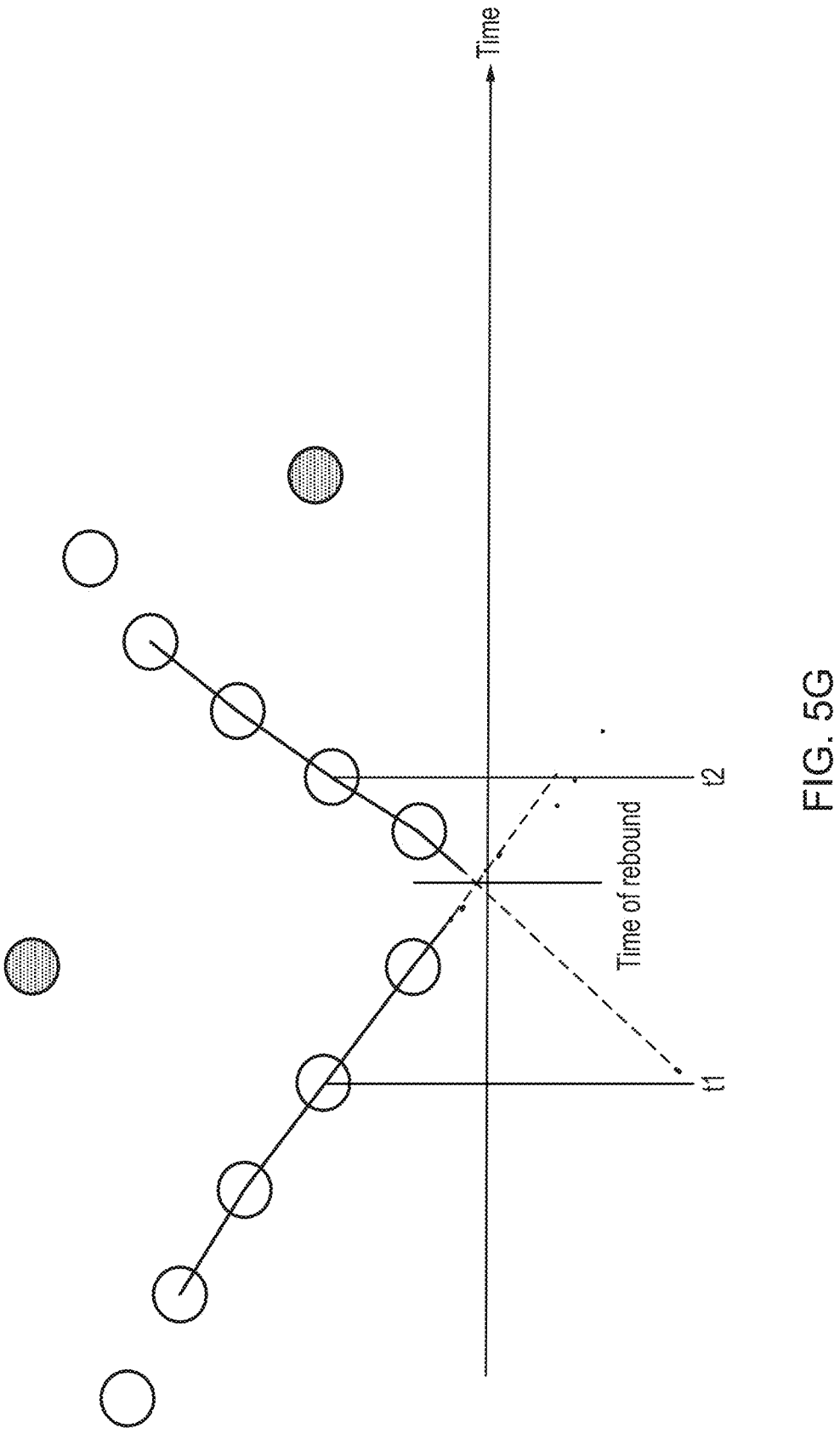

In order to determine the rebound, consecutive piecewise curves are evaluated. Specifically, the centre time of those piecewise curves is analysed. This is shown in FIG. 5G, where t1 is the centre time for the left side piecewise curve (at frame f+1) and t2 is the centre time for the right side piecewise curve (at frame f+4). The mid-point between these two centre times is approximately the time of the rebound.

This approximate time of the rebound is passed to step 420 where a more detailed analysis of the approximate rebound time is carried out. Specifically, a curve is fitted to the real-life position of the basketball for up to 7 points prior to the approximate time of the rebound and up to 7 points subsequent to the approximate time of the rebound. These provide a more accurate estimate of the time of the rebound and can determine the rebound to a sub-frame accuracy.

The process then moves to step 425 where the intersection of the curves is used to find the real-life position of the basketball and the time at which the impact took place. This also allows the speed change and the angle change which are fed to the impact classification step 320.

Returning to FIG. 4A, the process moves to step 430 where impact filtering takes place. In some instances, duplicate impacts may be detected. This occurs where any time and real-time position of impact occurs in close proximity. Therefore, in order to reduce the occurrence of these, the detected times and positions of each detected impact is compared to each other and where the differences are below a threshold (for example 1 ms and 2 mm), one of these impacts is ignored. Further, some impacts are so slight that they are not considered to be impacts. In this case, where the angle of change and/or the speed of the change is below a threshold value (for example 0.5° and 0.1 ms$^{-1}$), these are ignored.

The remaining impacts are passed to the impact classification step 320

Determining Real-Life Rim Position

Returning to FIG. 3, the real life rim position is determined in step 310. As noted above, this step is described in more detail in FIGS. 6A to 8.

In FIG. 6A, the process of determining the real-life rim position is explained in flowchart 700. The flowchart 700 starts at step 705. The process moves to step 710 where a colour space reference image of the captured image of the basketball rim is generated. This will be explained further with reference to FIGS. 7 and 8.

In FIG. 7 an image of the basketball rim 800 is captured by each camera. As will be appreciated, this is an RGB image captured by each one of the cameras 105A-N positioned in the stadium. It will be noted that the rim is one solid colour (an orange colour). In order to reduce the processing burden on the processing circuitry 205 when performing the detection of the basketball rim 800, a colour space reference image of the RGB image is generated. This is shown in FIG. 8.

As will be seen in FIG. 8, the colour space reference image references each pixel value to the orange colour of the basketball rim 800 in the RGB image of FIG. 7. In other words, the RGB colour that is most like the basketball rim 800 is output as black and the RGB colour that is least like the basketball rim 800 is output as white. In other words, the pixel value is the Euclidean distance of the reference colour to the pixel colour in RGB space.

This technique is useful in the context of object detection in an image as it is easier to identify the basketball rim in the image.

Although the above describes generating the colour space reference image for the entire image, the disclosure is not so limited. In fact, a segment of the RGB image may be extracted and the colour space reference image generated on that segment. Such a segment is shown as the bounding box 810 in FIG. 8. This reduces processing effort for the processing circuitry 205 and is particularly relevant as the basketball rim 800 does not move much during the game. The size and dimensions of the bounding box may be determined by the maximum distance that the basketball rim 800 may move during a basketball game.

After the colour space reference image is generated as in FIG. 8, the process moves to step 715. In step 715, Edge Filtering is performed on the colour space reference image. The output from Edge Filtering is an edge image where every pixel has an edge strength and edge direction. As there is a dark border between the black of the basketball rim 800 and the remainder of the colour space reference image, the edge of the basketball rim 800 is detected more quickly and easily than if that object detection was performed on the RGB image captured by the camera.

The process moves to step 720 where the real-life position of the basketball rim 800 is detected from the colour space reference image. This is achieved using a mapping technique described with reference to FIG. 6B.

Referring to FIG. 6B, the process 720 starts at step 721. The process described in steps 722 through to 726 will be carried out for the image captured by each of the cameras for each possible values of hoop x position, y position, pitch and roll of the basketball rim. As noted above, this is defined by the bounding box in embodiments.

After starting the process, the process then moves to step 722. In step 722, the 3D profile for the basketball rim is calculated. This is modelled as a circular pipe with a circular cross section which is thicker at the back (where the rim is mounted onto the backboard) than at the front. A plurality of points on this modelled rim are then selected. For example, 32 points may be selected around the modelled rim.

The process then moves to step 723 where these points are projected into the captured image. The process then moves to step 724 where at each projected point (i.e. at each projected pixel position), the value of the edge image is read. This is a value that has both an edge intensity and a direction of the edge. Typically, the higher the edge intensity, the more likely the point is on the basketball rim. This is further checked because the direction of the edge would be perpendicular to the tangent of the basketball rim. A score is established which is the probability that the x and y position and the pitch and roll of the model is correct. If the model perfectly fitted on the basketball rim within the image, the score of the model would be a maximum.

Moreover, as will be appreciated, typically the edge intensity is a bell-shaped curve with the maximum intensity being where the edge of the basketball rim is located. Accordingly, in the event that the edge intensity is at a maximum value, there is an increased probability that the edge of the basketball rim is at that point and so the score is increased.

The process moves to step 726 where the x and y position and the pitch and roll that provide the highest score for that image is selected.

The process moves to step 727 where a final optimisation for the x position, y position, pitch and roll is performed. Moreover, it is also possible to determine the z position at this stage. In particular, as each camera output provides the best x and y position and the best pitch and roll value, it is possible to perform an optimisation of the model across all cameras to provide an optimised final x position, y position, pitch and roll. Moreover, as there is a plurality of camera outputs, the z position can also now be optimised.

The optimised values are output to the impact classification step 320.

With reference back to FIG. 6A, the process then moves to step 735 where the next frame of video is retrieved and the process returns to the start 705 to be repeated for the next frame.

Real-Life Skeletal Feature Position Detection

Referring to FIG. 9, a hand 900 is shown. It will be appreciated that any other body part may be detected instead of or in addition to the hand 900. For example, the position of an arm, or leg may also be detected using known techniques such as those described in GB2589917A published on 16 Jun. 2021 (the contents of which is hereby incorporated by reference). The hand 900 is detected within the images captured of the basketball game. The real-life position of various features of the hand is then determined. In embodiments, the pose of the hand is determined using PoseNet. In particular, in embodiments, the "V2V-Posenet: Voxel-to-Voxel Prediction Network for Accurate 3D Hand and Human Pose Estimation from a Single Depth Map" CVPR 2018 is used to determine the pose of the hand. The pose of the hand identifies the wrist 910 and the tip of each finger 810 in the image captured by the various cameras.

As these features are extracted from the captured images, the position of these features in the captured images is determined. The position of these features is then triangulated from the captured images to the real-world position as noted above. These real-world positions are provided to the impact classification step.

In addition to the body part detection, it is possible to detect the player's team. This may be from detecting the vest worn by the basketball player and identifying the team from the vest (such as a team's colour or badge or the like). This is using known techniques.

Impact Classification Step

The Impact Classification Step will now be described with reference to FIGS. 10 and 11A, B and C. The impact classification step may be performed continually or upon request. Specifically, the impact classification step, which determines if a penalty violation has occurred, may be performed continuously during the match or may be performed only when a referee requires it.

Referring to FIG. 10, the impact detection output, the real-life rim position and the real-life skeletal feature position are fed into the Impact Classification step 320. The impact classification step 320 performs three separate processes to determine if a goal-tending violation has taken place. A first process 1220 is carried out to determine if a violation in respect of Rule 11.f has taken place. A second process 1240 is carried out to determine if a violation in respect of Rule 11.b has taken place and finally a third process 1260 is carried out to determine is a violation in respect of Rule 11.h has taken place. The first process 1220, the second process 1240 and the third process 1260 will be described with reference to FIGS. 11A, 11B and 11C respectively.

The output from the impact classification step is a signal giving an indication that a goaltending event (a penalty) or no penalty has taken place. In addition or instead, a video clip showing the alleged incident may be output from the impact classification step so that the game referee can determine whether he or she believes a goal-tending violation has taken place. Further, the indication may be provided to a broadcaster as part of the televised video footage or may be provided via a separate mechanism to allow the broadcaster to control access to the indication (via, for example, a subscription service). Of course the disclosure is not so limited and the indication may be provided to the entire stadium via a large screen or audio sound.

Referring to FIG. 11A, the first process will now be described. The process 1220 begins at step 1222. The process moves to step 1224 where the flight path of the basketball captured in the images from the various cameras located around the stadium is detected at its real-life position. The process then moves to step 1226 where the radius of the basketball is added to the ball position on the flight path. This is because the position of the centre of the basketball is determined in the impact detection determination where the flight path is established and by adding the radius to the detected position the edge of the basketball is established.

The process then moves to step 1228 where the edge of the basketball on its flight path is compared to the determined real-life rim position. In the event that the edge of the basketball does not fit within the rim position, the "no" path is followed to step 1230 where a "no penalty" indication is returned.

In the event that the edge of the basketball does fit within the rim position, then the basketball is deemed to be on a flight path to the basket and the "yes" path is followed to step 1232. In step 1232, the motion of the basketball is determined. Specifically, the motion of the basketball in the z direction is determined. In the event that the basketball is moving upwards in the z-direction, the "Up" path is followed to step 1234 and no penalty is indicated. However, in the event that the basketball is moving downwards in the z-direction, the "down" path is followed and a penalty is indicated in step 1236.

Figure 11B:
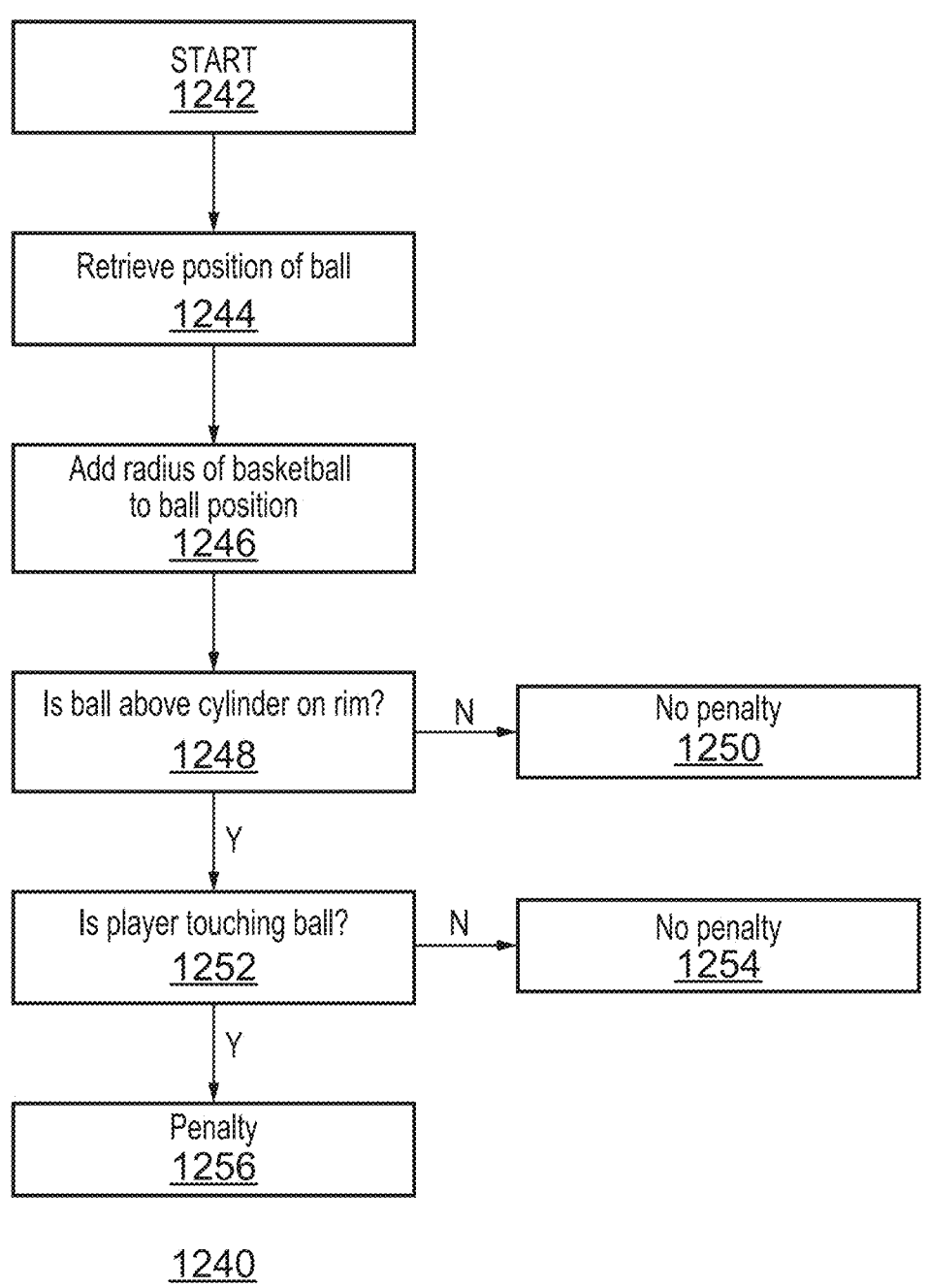

Referring to FIG. 11B, the second process will now be described. The process 1240 begins at step 1242. The process moves to step 1244 where the real-life position of the basketball is determined from the cameras located around the stadium. The process then moves to step 1246 where the radius of the basketball is added to its position. This is because the position of the centre of the basketball is determined and by adding the radius to the detected position the edge of the basketball is established. The real-life position of the edge of the basketball is compared to the real-life position of the basketball rim. More specifically, the real-life position of the edge of the basketball is compared to an imaginary cylinder above the real-life position of the basketball rim. In the event that the basketball is not above the basketball rim, the "no" path is followed to step 1250 where a "no penalty" indication is provided. Alternatively, if the real-life position of the basketball is located in a cylinder above the basketball rim, the "yes" path is followed to step 1252.

In step 1252, it is determined whether a player is touching the basketball. Specifically, it is determined whether the hand of a defending player is touching the basketball using the Real-Life Skeletal Feature Position Detection explained above. In other words, a comparison is made between the real-life position of the edge of the basketball and the real-life position of a defending player's fingers. The player may be identified as a defending player by analysing the colour of the vest or the number of the vest. In the event that the defending player is not touching the basketball, the "no" path is followed to step 1254 where a no penalty is indicated and if the defending plater is touching the basketball, the "yes" path is followed to step 1256 and a penalty indication is output.

Figure 11C:
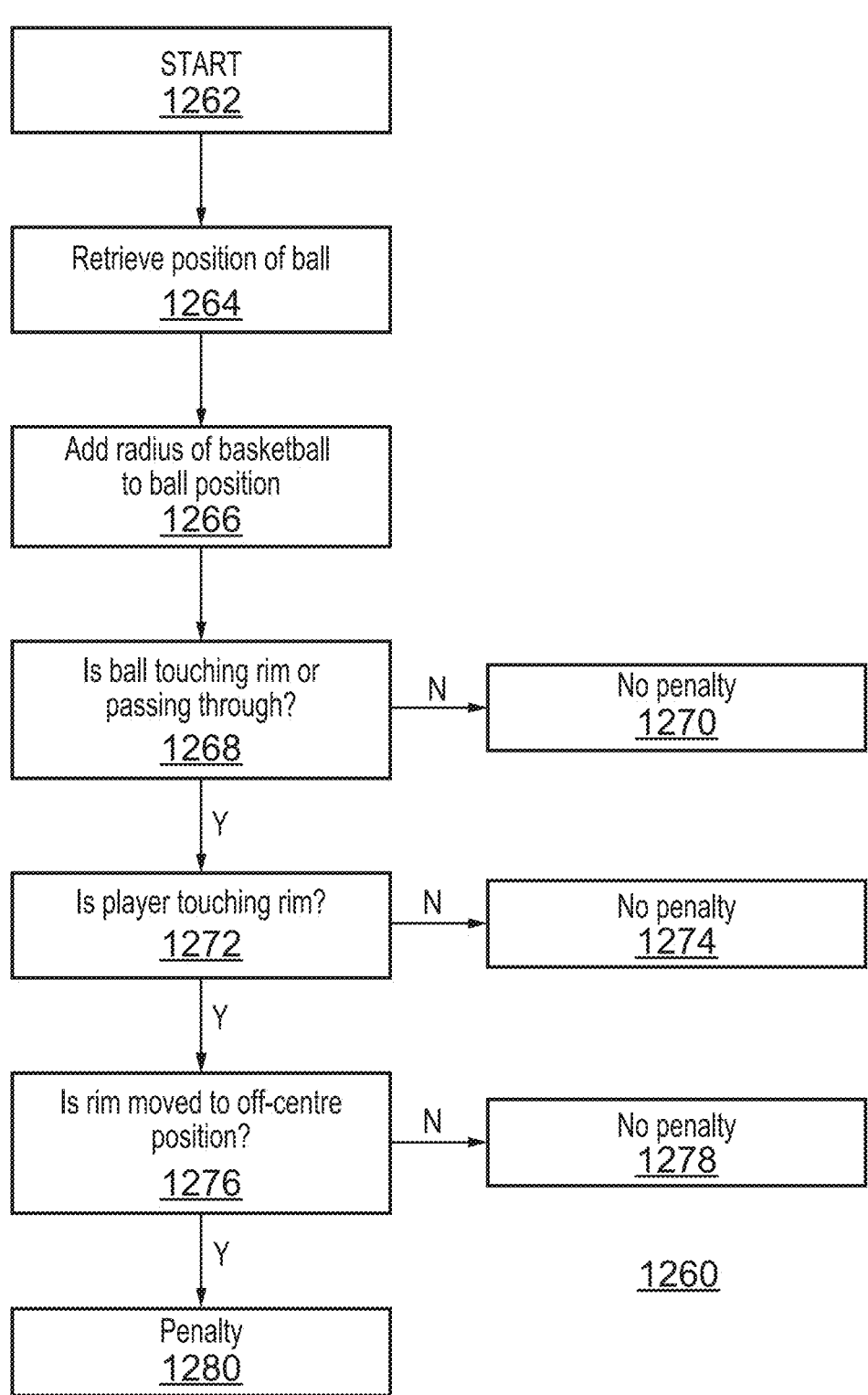

Referring to FIG. 11C, the third process will now be described. The process 1260 begins at step 1262. The process moves to step 1264 where the real-life position of the basketball is determined from the cameras located around the stadium. The process then moves to step 1266 where the radius of the ball basketball is added to the ball position. This is because the position of the centre of the basketball is determined and by adding the radius to the detected position the edge of the basketball is established. The process then moves to step 1268 where it is determined if the basketball is touching the basketball rim or is passing through the rim. This is achieved by comparing the real-life position of the basketball with the real-life position of the basketball rim. In the event that the basketball is not touching the rim or passing through the rim, the "no" path is followed to step 1270 where a "no penalty" indication is provided.

Alternatively, in the event that it is determined that the basketball is touching the basketball rim or is passing through the rim, the process moves to step 1272 where it is determined if the player is touching the basketball rim. This is achieved by comparing the real-life position of the rim with the real-life position of the player's fingers. In the event that the player's fingers are not touching the rim, the "no" path is followed to step 1274 where a "no penalty" is indicated. Alternatively, in the event that the player is determined to be touching the basketball rim, the "yes" path is followed to step 1276. In step 1276, it is determined whether the basketball rim is moved to an off-centre position. This is achieved by comparing the current real-life position of the rim with the centre position of the rim.

In the event that the rim is not moved to an off-centre position, the "no" path is followed to step 1278 where a "no penalty" indication is output. Alternatively, in the event that the rim is moved, the "yes" path is followed to step 1280 where a penalty indication is output.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A device for detecting a goaltending event, comprising circuitry configured to:
    determine a real-life position of a basketball from a video stream;
    detect an impact on the basketball from the movement of the basketball captured in the video stream;
    output a signal indicating a detected goaltending event based on the detected impact and the real-life position of the basketball.
2. A device according to clause 1, wherein the signal includes a time segment indicative of the position of the detected goaltending event within the video stream.

3. A device according to either clause 1 or 2 wherein the impact is detected based upon the deviation of movement of the basketball from a polynomial path.
4. A device according to any preceding clause, wherein the signal indicating a detected goaltending event is further based on the real-life position of the basketball relative to the real-life position of the basketball rim.
5. A device according to clause 4, wherein the real-life position of the basketball rim is determined by the steps of:
    converting one or more segments of a frame in the video stream into a colour space reference image, the reference colour being the colour of the basketball rim;
    performing edge detection on the colour space reference image; and
    determining the real-life position of the basketball rim based upon the edge detected colour space reference image.
6. A device according to clause 5, wherein the one or more segments include a segment bounding the basketball rim.
7. A device according to any preceding clause, wherein the real-life position of the basketball is determined by the steps of:
    performing object detection on a frame from the video stream to identify the position of one or more candidate basketballs within the frame using a machine learning technique.
8. A system comprising a device according to any preceding clause and a content providing device wherein the content providing device is configured to generate a clip of video based upon the signal output from the device.
9. A method for detecting a goaltending event, comprising:
    determining a real-life position of a basketball from a video stream;
    detecting an impact on the basketball from the movement of the basketball captured in the video stream;
    outputting a signal indicating a detected goaltending event based on the detected impact and the real-life position of the basketball.
10. A method according to clause 9, wherein the signal includes a time segment indicative of the position of the detected goaltending event within the video stream.
11. A method according to either clause 9 or 10 wherein the impact is detected based upon the deviation of movement of the basketball from a polynomial path.
12. A method according to any one of clauses 9 to 11, wherein the signal indicating a detected goaltending event is further based on the real-life position of the basketball relative to the real-life position of the basketball rim.
13. A method according to clause 12, wherein the real-life position of the basketball rim is determined by the steps of:
    converting one or more segments of a frame in the video stream into a colour space reference image, the reference colour being the colour of the basketball rim;
    performing edge detection on the colour space reference image; and
    determining the real-life position of the basketball rim based upon the edge detected colour space reference image.

14. A method according to clause 13, wherein the one or more segments include a segment bounding the basketball rim.

15. A method according to any one of clauses 9 to 14, wherein the real-life position of the basketball is determined by the steps of:

performing object detection on a frame from the video stream to identify the position of one or more candidate basketballs within the frame using a machine learning technique.

16. A method comprising generating a clip of video based upon the output signal and a method according to any one of clause 9 to 15.

17. A computer program product comprising computer readable instructions which, when loaded onto a computer configures the computer to perform a method according to any one of clause 9 to 16.

What is claimed is:

1. A device-system for detecting a goaltending event, comprising:

a plurality of cameras; and circuitry configured to:

receive a video stream from the cameras;

determine a real-life position of a basketball from a video stream by determining the pixels in the video stream that correspond to the basketball;

detect an impact on the basketball from the movement of the basketball captured in the video stream;

determine a real-life skeletal feature position; and output a signal indicating a detected goaltending event based on the detected impact and the real-life position of the basketball;

wherein the signal indicating the detected goaltending event is further based on the real-life position of the basketball relative to a real-life position of a basketball rim and the real-life skeletal feature position.

2. The system according to claim 1, wherein the signal includes a time segment indicative of the position of the detected goaltending event within the video stream.

3. The system according to claim 1, wherein the impact is detected based upon the deviation of movement of the basketball from a polynomial path.

4. The system according to claim 1, wherein the real-life position of the basketball is determined by the steps of:

performing object detection on a frame from the video stream to identify the position of one or more candidate basketballs within the frame using a machine learning technique.

5. The system according to claim 1, further comprising a content providing device wherein the content providing device is configured to generate a clip of video based upon the signal output from the device.

6. The system of claim 1, wherein the circuitry is configured to determine the real-life position of the basketball from the video stream by determining whether each pixel in the video stream is the center of the basketball.

7. The system according to claim 1, wherein the real-life position of the basketball rim is determined by the steps of:

converting one or more segments of a frame in the video stream into a colour space reference image, the reference colour being the colour of the basketball rim;

performing edge detection on the colour space reference image; and determining the real-life position of the basketball rim based upon the edge detected colour space reference image.

8. The system according to claim 7, wherein the one or more segments include a segment bounding the basketball rim.

9. The system of claim 1, wherein the circuitry is configured to determine the real-life position of the basketball from the video stream by placing reference circles having different radii over each pixel and determining whether there is an edge of a circle at a number of points distributed along the circumference of the reference circles.

10. The system of claim 9, wherein the circuitry is configured to determine the real-life position of the basketball from the video stream by further applying a score to each pixel to indicate a likelihood of each pixel being the center of the basketball.

11. A method for detecting a goaltending event, comprising:

receiving a video stream from cameras;

determining a real-life position of a basketball from a video stream by determining the pixels in the video stream that correspond to the basketball;

detecting an impact on the basketball from the movement of the basketball captured in the video stream;

determining a real-life skeletal feature position; and outputting a signal indicating a detected goaltending event based on the detected impact and the real-life position of the basketball, wherein the signal indicating the detected goaltending event is further based on the real-life position of the basketball relative to a real-life position of a basketball rim and the real-life skeletal feature position.

12. The method according to claim 11, wherein the signal includes a time segment indicative of the position of the detected goaltending event within the video stream.

13. The method according to claim 11 wherein the impact is detected based upon the deviation of movement of the basketball from a polynomial path.

14. The method according to claim 11, wherein the real-life position of the basketball is determined by the steps of:

performing object detection on a frame from the video stream to identify the position of one or more candidate basketballs within the frame using a machine learning technique.

15. A method comprising generating a clip of video based upon the output signal and a method according to claim 11.

16. A non-transitory computer readable medium storing a program product comprising computer readable instructions which, when loaded onto a computer, configures the computer to perform the method according to claim 11.

17. The method of claim 11, wherein determining the real-life position of the basketball from the video stream includes placing reference circles having different radii over each pixel and determining whether there is an edge of a circle at a number of points distributed along the circumference of the reference circles.

18. The system of claim 11, wherein determining the real-life position of the basketball from the video stream includes determining whether each pixel in the video stream is the center of the basketball.

19. The method according to claim 11, wherein the real-life position of the basketball rim is determined by the steps of:

converting one or more segments of a frame in the video stream into a colour space reference image, the reference colour being the colour of the basketball rim;

performing edge detection on the colour space reference image; and determining the real-life position of the basketball rim based upon the edge detected colour space reference image.

20. The method according to claim 19, wherein the one or more segments include a segment bounding the basketball rim.

\* \* \* \* \*